United States Patent [19]

Berlovitch et al.

[11] Patent Number: 6,061,334
[45] Date of Patent: May 9, 2000

[54] APPARATUS AND METHOD FOR ASSIGNING VIRTUAL LANS TO A SWITCHED NETWORK

[75] Inventors: Albert Berlovitch, Rishon le Zion; Michael Shurman, Jerusalem; Menachem Shoua, Ramat Gan, all of Israel

[73] Assignee: Lucent Technologies Networks Ltd, Murray Hill, N.J.

[21] Appl. No.: 08/779,143

[22] Filed: Jan. 6, 1997

[30] Foreign Application Priority Data

Jul. 30, 1996 [IL] Israel ............................ 118984

[51] Int. Cl.⁷ .................................. H04L 12/28
[52] U.S. Cl. ............................ 370/255; 370/400
[58] Field of Search .................... 370/254, 255, 370/400, 401, 351, 395

[56] References Cited

U.S. PATENT DOCUMENTS

| | | | |
|---|---|---|---|
| 4,823,338 | 4/1989 | Chan et al. | 370/522 |
| 5,394,402 | 2/1995 | Ross | 370/402 |
| 5,684,800 | 11/1997 | Dobbins et al. | 370/401 |
| 5,740,171 | 4/1998 | Mazzola et al. | 370/392 |
| 5,742,604 | 4/1998 | Edsall et al. | 370/401 |
| 5,752,003 | 5/1998 | Hart | 395/500 |
| 5,812,552 | 9/1998 | Arora et al. | 370/401 |

OTHER PUBLICATIONS

Malamud, C.—IPX and SPX in *"Analyzing Novel Networks"* (New York, Van Nostrand Rheinhold 1992) pp. 82, 83, 94 and 95.

Steven S. King, Switched Virtual: Internetworking Moves Beyond Bridges and Routers, Data Communications, Sep. 1994, pp. 66–79.

Stephen Saunders, Switch Puts Virtual LANs on Automatic Pilot, Data Communications Sep. 1994, pp. 45–46.

Nick Lippis, Virtual LANs: Real Drawbacks, Data Communications, Dec. 1994, pp. 23–24.

Agile Networks, Inc., ATMizer 125 ATM and Ethernet Switch, Email: info.agile.com, World Wide Web: http://www.agile.com (Brochure).

Agile Networks, Inc., ATMizer 121 Ethernet Switch, Email: info.agile.com, World Wide Web: http://www.agile.com. (Brochure).

Agile Networks, Inc., ATMman Virtual LAN Policy Manager, Email: info.agile.com, World Wide Web: http://www.agile.com. (Brochure).

Eric Lach, UB Software Manages Virtual LANs, CommWeek Interactive, View: http://techweb.cmp.com/cw/current, 1996.

*Primary Examiner*—Douglas W. Olms
*Assistant Examiner*—David R Vincent

[57] ABSTRACT

This invention discloses an apparatus for managing a switched routed network including a network configuration learning unit operative to learn a configuration of the switched routed network, a VLAN assignment unit for generating a division of the network into virtual LANs (VLANs) based on the learned configuration of the network; and a change manager operative to detect a change in the configuration of the network and to modify the division of the network into VLANs. A method for generating a division of a switched routed network into virtual LANs based on a learned configuration of the network is also disclosed.

33 Claims, 33 Drawing Sheets

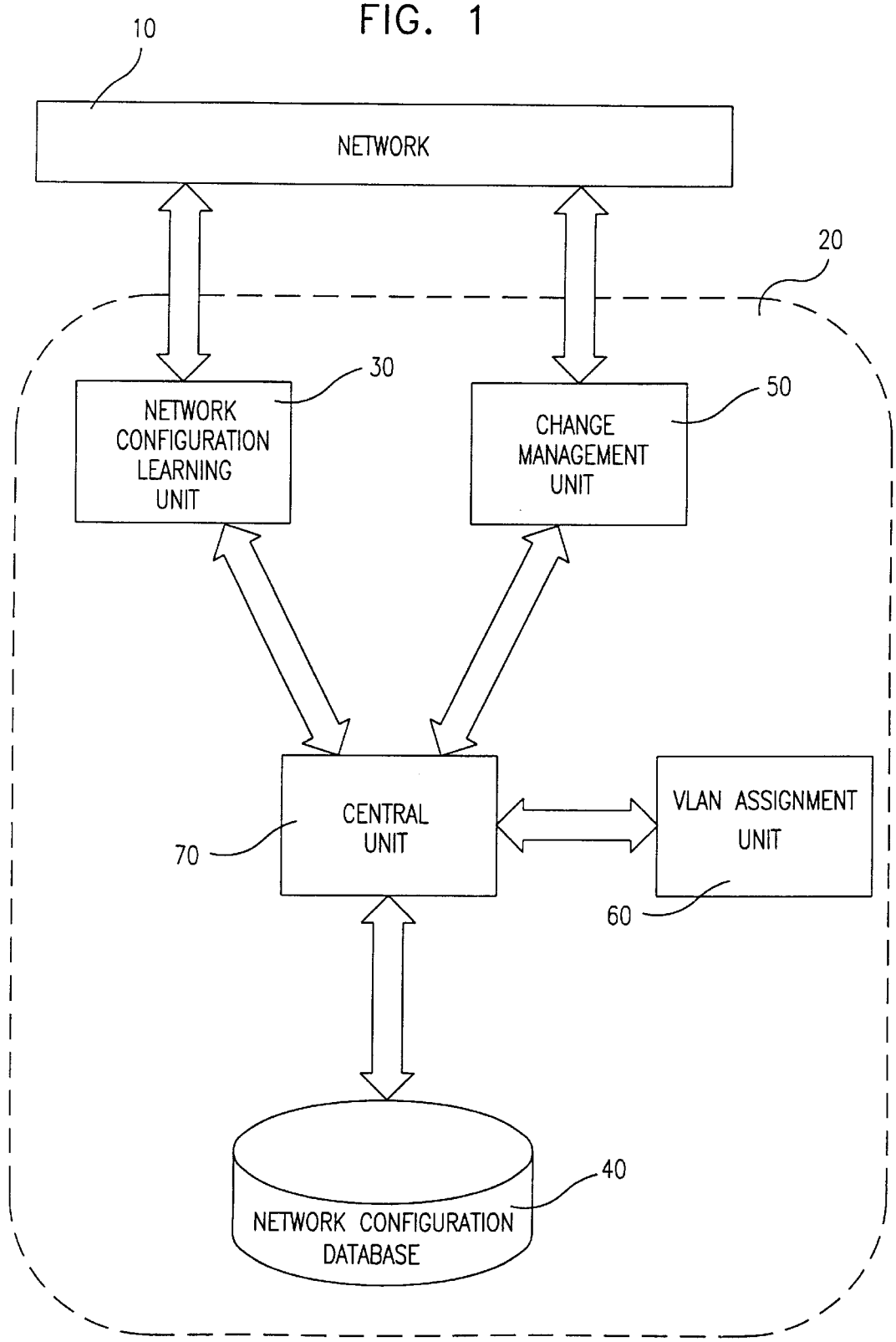

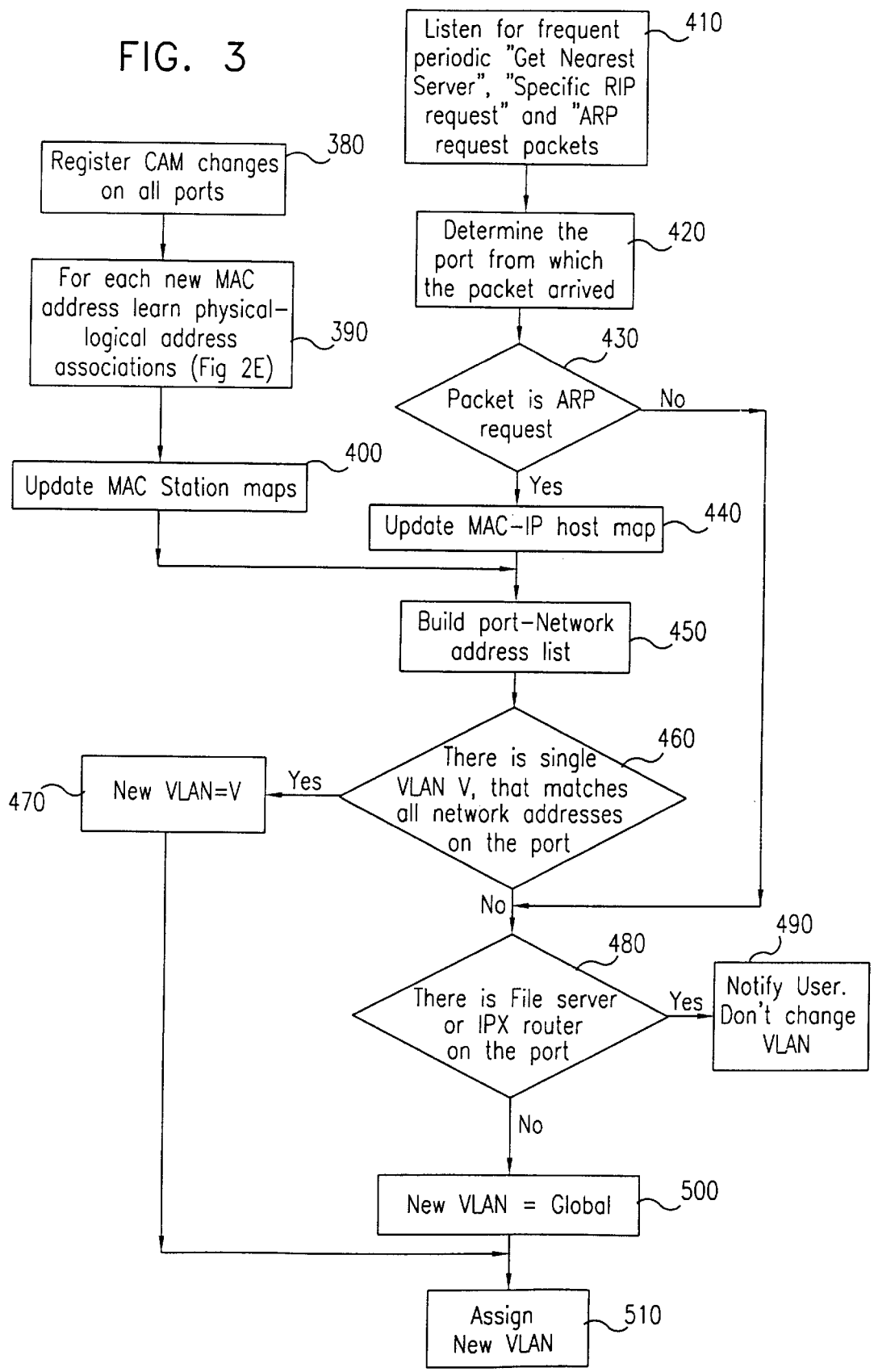

VLAN Server

Configure  View  Reports                          Help

Net To VLAN Mapping

Sort by:  ALL

| Current VLAN | Proposed VLAN | IPX/IP | NetAddress |
|---|---|---|---|
| 255 Global | 1 Marketing | IP | 176.205.5.0 |
| 255 Global | 2 LAB | IP | 176.205.6.0 |
| 255 Global | 3 Embedded | IP | 176.205.7.0 |
| 255 Global | 1 Marketing | IP | 176.205.8.0 |
| 255 Global | 1 Marketing | IP | 260 |
| 255 Global | 2 LAB | IPX | 261 |
| 255 Global | 3 Embedded | IPX | 262 |

| Current VLAN | Proposed VLAN | IPX/IP | NetAddress |

[Modify] [Undo]                                   [Help]

[Apply] [Refresh]

FIG. 16

Table: MAC to Switch Port connection table

MAC To Port Table (rows 1-20 of 20)

| MacAddress | Hub Name | Hub IP | Slot/Port | Type | Network Address | VLAN |
|---|---|---|---|---|---|---|
| poly | moni | 176.205.5.12 | 7/1 MP | IP | 176.205.5.2 | 255 |
| poly | moni | 176.205.5.12 | 7/1 MP | NovellClient | 260 | 255 |
| 176.205.8.100 | moni | 176.205.5.12 | 8/2 | IP | 176.205.8.100 | 255 |
| 176.205.8.100 | moni | 176.205.5.12 | 8/2 | NovellClient | 261 | 255 |
| vnsb | moni | 176.205.5.12 | 3/1 | IP | 176.205.6.200 | 255 |
| vnsb | moni | 176.205.5.12 | 3/1 | FileServer – VNSB | 261 | 255 |
| 176.205.5.12 | moni | 176.205.5.12 | 7/6 | IP | 176.205.5.12 | 255 |
| 176.205.5.1 | moni | 176.205.5.12 | 7/6 | IPRouter | 176.205.8.1 | 255 |
| 176.205.5.1 | moni | 176.205.5.12 | 7/6 | IPRouter | 176.205.5.1 | 255 |
| 176.205.5.1 | moni | 176.205.5.12 | 7/6 | IPXRouter | 260 | 255 |
| 176.205.5.1 | moni | 176.205.5.12 | 7/7 | IPRouter | 176.205.6.1 | 255 |
| 176.205.5.1 | moni | 176.205.5.12 | 7/7 | IPXRouter | 261 | 255 |
| 176.205.5.1 | moni | 176.205.5.12 | 7/8 | IPRouter | 176.205.7.1 | 255 |
| 176.205.5.1 | moni | 176.205.5.12 | 7/8 | IPXRouter | 262 | 255 |
| 176.205.6.150 | moni | 176.205.5.12 | 7/3 | NovellClient | 261 | 255 |
| 176.205.6.150 | moni | 176.205.5.12 | 7/3 | IP | 176.205.8.200 | 255 |
| vnsa | moni | 176.205.5.12 | 3/2 | FileServer – VNSA | 260 | 255 |
| vnsa | moni | 176.205.5.12 | 3/2 | IP | 176.205.6.100 | 255 |
| 176.205.6.100 | moni | 176.205.5.12 | 8/1 | NovellClient | 261 | 255 |
| 176.205.6.100 | moni | 176.205.5.12 | 8/1 | | | |

FIG. 19

Novell Client to File Server attachment

Table  Server to Client (rows 1-5 of 5)

| Client Name | IPXNet | Server Name |
|---|---|---|
| poly | 260 | VNSB |
| poly | 260 | VNSA |
| 176.205.8.100 | 261 | VNSB |
| 176.205.6.150 | 261 | VNSA |
| 176.205.6.100 | 261 | VNSB |

FIG. 20

| Configure | View | Reports | | | | | Help |
|---|---|---|---|---|---|---|---|
| VLAN Server | | | | | | | |
| Sort by: | ALL | | | | | | |
| Net To VLAN Mapping | | | | | | | |
| Current VLAN | Proposed VLAN | | IPX/IP | NetAddress | | | |
| 255 Global | 1 Marketing | | IP | 176.205.5.0 | | | |
| 255 Global | 2 LAB | | IP | 176.205.6.0 | | | |
| 255 Global | 3 Embedded | | IP | 176.205.7.0 | | | |
| 255 Global | 1 Marketing | | IP | 176.205.8.0 | | | |
| 255 Global | 1 Marketing | | IPX | 260 | | | |
| 255 Global | 2 LAB | | IPX | 261 | | | |
| 255 Global | 3 Embedded | | IPX | 262 | | | |
| Current VLAN | Proposed VLAN | | IPX/IP | NetAddress | | | |
| Modify | Undo | | | | | | |
| Apply | Refresh | | | | | | Help |

FIG. 21

VLAN Server

Configure  View  Reports  Help

Net To VLAN Mapping

Sort by: Net Addreess

| Current VLAN | Proposed VLAN | IPX/IP | NetAddress |
|---|---|---|---|
| 1 Marketing | 1 Marketing | IP | 176.205.5.0 |
| 3 Embedded | 2 VNSLab | IP | 176.205.6.0 |
| 100 VLAN#100 | 3 Embedded | IP | 176.205.7.0 |
| 100 VLAN#100 | 4 TechSupport | IP | 176.205.8.0 |
| 1 Marketing | 5 Finance | IPX | 260 |
| 3 Embedded | 6 HR | IPX | 261 |
| 3 Embedded | 7 VLAN#7 | IPX | 262 |

| Current VLAN | Proposed VLAN | IPX/IP | NetAddress |
|---|---|---|---|

Modify  Undo

Apply  Refresh  Help

FIG. 22

VLAN Server

Configure View Reports Help

Net To VLAN Mapping

Sort by: ALL

| Current VLAN | Proposed VLAN | IPX/IP | NetAddress |
|---|---|---|---|
| 255 Global | 1 Marketing | IP | 176.205.5.0 |
| 255 Global | 2 LAB | IP | 176.205.6.0 |
| 255 Global | 3 Embedded | IP | 176.205.7.0 |
| 255 Global | 1 Marketing | IP | 176.205.8.0 |
| 255 Global | 1 Marketing | IPX | 260 |
| 255 Global | 2 LAB | IPX | 261 |
| 255 Global | 3 Embedded | IPX | 262 |

| Current VLAN | Proposed VLAN | IPX/IP | NetAddress |
|---|---|---|---|

[Modify] [Undo] [Help]

[Apply] [Refresh]

FIG. 23

Reserved LANSwitch Ports

Reserved LANSwitch Ports
Filter by: *

| Hub IP | Module | Port |
|---|---|---|
| 176.205.5.12 | 9 LSE404st | 2 |
| 176.205.5.12 | 9 LSE404st | 3 |

List of LANSwitch Ports
Filter by: *

| Hub IP | Module | Port |
|---|---|---|
| 176.205.5.12 | 3 LSE208 | 1 |
| 176.205.5.12 | 3 LSE208 | 2 |
| 176.205.5.12 | 7 LSE808 | 2 |
| 176.205.5.12 | 7 LSE808 | 3 |
| 176.205.5.12 | 7 LSE808 | 4 |
| 176.205.5.12 | 7 LSE808 | 5 |
| 176.205.5.12 | 7 LSE808 | 6 |
| 176.205.5.12 | 7 LSE808 | 7 |
| 176.205.5.12 | 7 LSE808 | 8 |
| 176.205.5.12 | 8 LSE208 | 1 |

[Delete Reserved Port] [Close] [Add Reserved Port] [Help]

FIG. 25

| Table | Switch Port to VLAN | | | |
|---|---|---|---|---|
| Hub Name | Hub IP | Slot/Port | IPSubnet/IPXNet | VLAN |
| moni | 176.205.5.12 | 3/1 | 261 | 255 |
| moni | 176.205.5.12 | 3/1 | 176.205.6.0 | 255 |
| moni | 176.205.5.12 | 3/2 | 260 | 255 |
| moni | 176.205.5.12 | 3/2 | 176.205.8.0 | 255 |
| moni | 176.205.5.12 | 7/1MP | 260 | 255 |
| moni | 176.205.5.12 | 7/1MP | 261 | 255 |
| moni | 176.205.5.12 | 7/1MP | 176.205.5.0 | 255 |
| moni | 176.205.5.12 | 7/2 | no connection | 255 |
| moni | 176.205.5.12 | 7/3 | 260 | 255 |
| moni | 176.205.5.12 | 7/3 | 261 | 255 |
| moni | 176.205.5.12 | 7/3 | 176.205.6.0 | 255 |
| moni | 176.205.5.12 | 7/4 | no connection | 255 |
| moni | 176.205.5.12 | 7/5 | no connection | 255 |
| moni | 176.205.5.12 | 7/6 | 260 | 255 |
| moni | 176.205.5.12 | 7/6 | 176.205.5.0 | 255 |
| moni | 176.205.5.12 | 7/6 | 176.205.8.0 | 255 |
| moni | 176.205.5.12 | 7/7 | 261 | 255 |
| moni | 176.205.5.12 | 7/7 | 176.205.8.0 | 255 |
| moni | 176.205.5.12 | 7/8 | 262 | 255 |
| moni | 176.205.5.12 | 7/8 | 176.205.7.0 | 255 |

FIG. 28

MAC to Switch Port connection table

MAC To Port Table (rows 1-20 of 20)

| MacAddress | Hub Name | Hub IP | Slot/Port | Type | Network Address | VLAN |
|---|---|---|---|---|---|---|
| poly | moni | 176.205.5.12 | 7/1 MP | IP | 176.205.5.2 | 255 |
| poly | moni | 176.205.5.12 | 7/1 MP | NovellClient | 260 | 255 |
| 176.205.8.100 | moni | 176.205.5.12 | 8/2 | IP | 176.205.8.100 | 255 |
| 176.205.8.100 | moni | 176.205.5.12 | 8/2 | NovellClient | 261 | 255 |
| vnsb | moni | 176.205.5.12 | 3/1 | IP | 176.205.6.200 | 255 |
| vnsb | moni | 176.205.5.12 | 3/1 | FileServer – VNSB | 261 | 255 |
| 176.205.5.12 | moni | 176.205.5.12 | 7/6 | IP | 176.205.5.12 | 255 |
| 176.205.5.1 | moni | 176.205.5.12 | 7/6 | IPRouter | 176.205.8.1 | 255 |
| 176.205.5.1 | moni | 176.205.5.12 | 7/6 | IPRouter | 176.205.5.1 | 255 |
| 176.205.5.1 | moni | 176.205.5.12 | 7/6 | IPXRouter | 260 | 255 |
| 176.205.5.1 | moni | 176.205.5.12 | 7/7 | IPRouter | 176.205.6.1 | 255 |
| 176.205.5.1 | moni | 176.205.5.12 | 7/7 | IPXRouter | 261 | 255 |
| 176.205.5.1 | moni | 176.205.5.12 | 7/8 | IPRouter | 176.205.7.1 | 255 |
| 176.205.5.1 | moni | 176.205.5.12 | 7/8 | IPXRouter | 262 | 255 |
| 176.205.6.150 | moni | 176.205.5.12 | 7/3 | IP | 176.205.6.150 | 255 |
| 176.205.6.150 | moni | 176.205.5.12 | 7/3 | NovellClient | 261 | 255 |
| vnsa | moni | 176.205.5.12 | 3/2 | IP | 176.205.8.200 | 255 |
| vnsa | moni | 176.205.5.12 | 3/2 | FileServer – VNSA | 260 | 255 |
| 176.205.6.100 | moni | 176.205.5.12 | 8/1 | IP | 176.205.6.100 | 255 |
| 176.205.6.100 | moni | 176.205.5.12 | 8/1 | NovellClient | 261 | 255 |

FIG. 29

Novell Client to File Server attachment

Table  Server to Client (rows 1-5 of 5)

| Client Name | IPXNet | Server Name |
|---|---|---|
| poly | 260 | VNSB |
| poly | 260 | VNSA |
| 176.205.8.100 | 261 | VNSB |
| 176.205.6.150 | 261 | VNSA |
| 176.205.6.100 | 261 | VNSB |

FIG. 30

| | VLAN Server | |
|---|---|---|
| Configure View Reports | | Help |

Net To VLAN Mapping

Sort by: ALL

| Current VLAN | Proposed VLAN | IPX/IP | NetAddress |
|---|---|---|---|
| 1 Marketing | 1 Marketing | IP | 176.205.5.0 |
| 1 Marketing | 1 Marketing | IP | 176.205.8.0 |
| 1 Marketing | 10 VLAN#10 | IPX | 260 |
| 2 VNSLab | 2 VNSLab | IPX | 261 |
| 2 VNSLab | 2 VNSLab | IP | 176.205.6.0 |
| 3 Embedded | 3 Embedded | IPX | 262 |
| 3 Embedded | 3 Embedded | IP | 176.205.7.0 |

| Current VLAN | Proposed VLAN | IPX/IP | NetAddress |
|---|---|---|---|

[Modify] [Undo] [Help]

[Apply] [Refresh]

FIG. 34

APPARATUS AND METHOD FOR ASSIGNING VIRTUAL LANS TO A SWITCHED NETWORK

FIELD OF THE INVENTION

The present invention relates to apparatus and methods for network management.

BACKGROUND OF THE INVENTION

ATMman Virtual LAN software, by Agile Networks, Ltd., is intended to inspect LAN traffic at the network layer and to create layer-3 based virtual LANs. Two key features are termed the Global Endstation Identification feature and the IP address management feature. Agile has stated that its end-station identification system allows the physical location and MAC address of each end-station on the network, as well as its protocol types, network-layer addresses, network-layer names and network function. The IP Address Management system is to maintain a database of layer 1, 2 and 3 information about each end-station on the network and informs administrators of any new, changed or duplicate IP addresses that appear.

The disclosures of all publications mentioned in the specification and of the publications cited therein are hereby incorporated by reference.

SUMMARY OF THE INVENTION

The present invention seeks to provide an improved method and apparatus for managing networks, including methods and apparatus which include any of the features described herein either individually or in any combination.

There is thus provided, in accordance with a preferred embodiment of the present invention, apparatus for managing a switched routed network including a network configuration learning unit operative to learn a configuration of the switched routed network, a VLAN assignment unit for generating a division of the network into virtual LANs (VLANs) based on the learned configuration of the network, and a change manager operative to detect a change in the configuration of the network and to modify the division of the network into VLANs.

Further in accordance with a preferred embodiment of the present invention, the configuration of the network includes physical configuration aspects and logical configuration aspects.

Also provided, in accordance with a preferred embodiment of the present invention, is apparatus for learning the configuration of a switched routed network, the network including a switching skeleton including at least one switching hub interconnected by a switch backbone, each switching hub including at least one port, and a plurality of end-stations each having a unique physical address and each communicating with an individual one of the switching hubs via one of the switching hub's ports, thereby defining a plurality of end-station to port connections, the plurality of end-stations including at least one router, the apparatus including an end-station to port connection learning unit operative to learn associations between ports and physical addresses of the end-stations communicating therewith, a physical address-logical address association learning unit operative to learn associations between logical addresses and physical addresses, and an end-station to logical address association learning unit operative to derive associations between ports and logical addresses from the learned associations between ports and physical addresses of the end stations and the learned associations between logical addresses and physical addresses.

Further in accordance with a preferred embodiment of the present invention, the physical address-logical address association learning unit is operative to scan physical addresses of at least some of the plurality of end stations, and actively find an associated logical address upon encountering each physical address.

Further in accordance with a preferred embodiment of the present invention, each logical address includes an IP network layer address and wherein the network includes an IP network which is partitioned into a multiplicity of IP subnets and wherein each IP network layer address belongs to an individual one of the multiplicity of subnets and wherein the apparatus for learning also includes apparatus for determining all IP subnets into which the IP network is partitioned.

Still further in accordance with a preferred embodiment of the present invention, each logical address includes an IPX protocol network layer address and wherein the network is partitioned into a multiplicity of IPX networks and wherein each IPX protocol network layer address belongs to an individual one of the multiplicity of IPX networks and wherein the apparatus for learning also includes apparatus for determining all IPX networks into which the IPX network is partitioned.

Additionally in accordance with a preferred embodiment of the present invention, the physical address-logical address association learning unit is operative to send a multiplicity of ICMP echo request packets to each of at least some of the plurality of end stations, each echo request packet including a physical destination address and an IP network layer destination address which includes an IP broadcast address of an individual one of the multiplicity of subnets, and the echo request packet sent to an individual end station has a physical destination address which is the physical address of the individual end station.

Further in accordance with a preferred embodiment of the present invention, the physical address-logical address association learning unit includes an ICMP echo reply packet analyzer operative to derive a physical address—IP address association from each arriving ICMP echo reply packet.

Still further in accordance with a preferred embodiment of the present invention, the physical address-logical address association learning unit is operative to send an IPX diagnostic packet to each of at least some of the plurality of end stations, an IPX diagnostic packet including a physical destination address and an IPX network layer destination address which includes an IPX broadcast address, and the IPX diagnostic packet sent to an individual end station includes an IPX diagnostic packet whose physical destination address is the physical address of the individual end station.

Additionally in accordance with a preferred embodiment of the present invention, the physical address-logical address association learning unit includes an IPX diagnostic packet analyzer operative to derive a physical address - IPX address association from each arriving IPX diagnostic reply packet.

Further in accordance with a preferred embodiment of the present invention, the physical address-logical address association learning unit includes an IP network layer address identifier operative, for each physical address, to passively identify a logical address including an IP network layer address, and the IP network layer address identifier is operative to listen for ARP packets and to analyze the ARP packets and derive therefrom IP network layer addresses.

Further in accordance with a preferred embodiment of the present invention, the network includes a NetWare network, (NetWare is commercially available from Novell Inc. of 122 East 1700 South, Provo, Utah 84606, USA), the plurality of end-stations includes at least one NetWare file servers and at least one NetWare clients, each of the NetWare clients is served by one of the at least one NetWare file servers, and the apparatus for learning also includes a server-client learner operative to identify servers and clients from among the plurality of end-stations and to learn relationships between the servers and the clients.

Also provided, in accordance with another preferred embodiment of the present invention, is a method for generating a division of a switched routed network into virtual LANs (VLANs) based on a learned configuration of the network, the network including a switching skeleton including at least one switching hubs interconnected by a switch backbone, each switching hub including at least one port, and a plurality of end-stations each having a unique physical address and each communicating with an individual one of the switching hubs via one of the switching hub's ports, thereby defining a plurality of end-station to port connections, the plurality of end-stations including at least one router, the method including dividing the plurality of end-stations into nodes, wherein each node includes a set of at least one end-station, connecting each first and second node from among the nodes with an arc if at least one of the end-stations in the first node set is associated with the same port as at least one of the end-stations in the second node set, thereby to generate at least one disjoint graphs, and allocating a VLAN to each of the at least one disjoint graphs characterized in that packets sent by an individual end-station connected to a port belonging to an individual VLAN, including broadcast packets, are transmitted only to end-stations connected to one of the ports within the same VLAN.

Further in accordance with a preferred embodiment of the present invention, the network includes an IP network which is partitioned into a multiplicity of IP subnets and the sets respectively correspond to the IP subnets.

Still further in accordance with a preferred embodiment of the present invention, the network is partitioned into a multiplicity of IPX networks and the sets respectively correspond to the IPX networks.

Additionally in accordance with a preferred embodiment of the present invention, the network includes a NetWare network and wherein the plurality of end-stations includes at least one NetWare file servers and at least one NetWare clients and wherein each of the NetWare clients is served by one of the at least one NetWare file servers, and wherein each of the sets includes an individual NetWare file server and the NetWare clients served thereby.

Still further in accordance with a preferred embodiment of the present invention, the VLANs are allocated so as to increase the number of clients which communicate directly with their servers rather than via a router.

Further in accordance with a preferred embodiment of the present invention, the method also includes the step of allocating global VLANs to at least one of the ports so as to reduce the number of end-station pairs which hear broadcast packets arriving to one another.

Still further in accordance with a preferred embodiment of the present invention, the method also includes the step of allocating global VLANs to at least one of the ports so as to minimize the number of end-station pairs which hear broadcast packets arriving to one another.

Also provided, in accordance with another preferred embodiment of the present invention, is a method for detecting a change in the configuration of a switched routed network, the network including a plurality of network elements, and for modifying a division of the network into VLANs, the method including detecting at least one event at an individual network element including detecting the identity of the individual end-station, the event including at least one of the following: at least one logical change, at least one physical change, and at least one communication failure, and categorizing at least one event as a problematic event or a non-problematic event and, if the event is categorized as problematic, alleviating the failure situation.

Further in accordance with a preferred embodiment of the present invention, the at least one physical change includes at least one of the following: at least one new end-station added at at least one individual port within the network, and at least one end-station which has moved from a first port within the network to a second port within the network.

Still further in accordance with a preferred embodiment of the present invention, at least one logical change includes an IP address of at least one end-station which has changed.

Additionally in accordance with a preferred embodiment of the present invention, at least one communication failure includes at least one of a failed attempt of a NetWare client end-station to initially connect to a server end-station, and a NetWare client end-station which has been disconnected from a server end-station.

Further in accordance with a preferred embodiment of the present invention, the analyzing and alleviating step includes detecting a mismatch between the network address of an end-station and a VLAN to which the port to which the end-station is connected belongs, determining a new VLAN which matches the network addresses of all end-stations connected to the port, and assigning the new VLAN to the port.

Also provided, in accordance with another preferred embodiment of the present invention, is apparatus for generating a VLAN assignment scheme according to which individual components of a network are assigned to VLANs, the apparatus including a reserved port designator operative to accept a user's designation of ports within the network to which no VLAN is to be assigned, and a VLAN assignment scheme generator operative to generate a VLAN assignment scheme according to which only components of the network other than the reserved ports are assigned to VLANs.

Also provided, in accordance with yet another preferred embodiment of the present invention, is apparatus for managing a switched routed network including a network configuration learning unit operative to learn a configuration of a switched routed network including an existing division into VLANs, and a VLAN assignment unit for generating a new division of the network into virtual LANs (VLANs) based on the learned configuration of the network, wherein the network configuration learning unit includes a diagnostic unit for analyzing and diagnosing the existing division of the network into VLANs.

Further in accordance with a preferred embodiment of the present invention, the diagnostic unit is operative to identify end-stations which belong to the same IP subnet and which are connected to ports assigned to different VLANs.

Still further in accordance with a preferred embodiment of the present invention, the diagnostic unit is operative to identify Novell servers belonging to different IPX networks which are connected to ports assigned to a single VLAN.

Additionally in accordance with a preferred embodiment of the present invention, the diagnostic unit is operative to identify IPX routers belonging to different IPX networks which are connected to ports assigned to a single VLAN.

Further in accordance with a preferred embodiment of the present invention, the method also includes storing a record of problematic and non-problematic events occurring at network elements.

Still further in accordance with a preferred embodiment of the present invention, the record of problematic events includes, for each problematic event, a description of a contradictory VLAN assignment associated with the problematic event.

Further in accordance with a preferred embodiment of the present invention, the record of problematic events includes, for at least one problematic event, a recommendation describing how a human operator may resolve the contradictory VLAN assignment.

Additionally in accordance with a preferred embodiment of the present invention, the record of problematic events includes, for at least one problematic event, a description of a system action which resolves the contradictory VLAN assignment.

Further in accordance with a preferred embodiment of the present invention, the step of alleviating includes alerting a human operator that a problematic event has occurred.

The methods and apparatus of the present invention herein collects data pertaining to the IP or IPX configuration of the network. This data is employed by a rule-based system, typically implemented in software, which applies predefined rules to assign virtual LANs to the network, so as to conform as closely as possible to predetermined bestness criteria. It is appreciated that some or all of the particular rules and criteria employed are application-specific. Specifically, the specific implementation of a virtual LAN in the hardware may affect the rules and/or criteria. If, for example, the hardware implements a global LAN, then the rule-based system may be based on improving or optimizing a broadcast matrix whereas the rule-based system may not be based on this criterion if the hardware does not implement a global LAN.

According to a preferred embodiment of the present invention, the elements of a network are grouped into predefined entities such as sets or graphs. The apparatus and methods of the present invention are based on computational processes which operate on these predefined entities. The rules and criteria for grouping may be application-specific, however, the computational processes are preferably defined generally enough so as to be operational in conjunction with different application-specific rules and criteria.

BRIEF DESCRIPTION OF THE DRAWINGS

The present invention will be understood and appreciated from the following detailed description, taken in conjunction with the drawings in which:

FIG. 1 is a simplified block diagram of apparatus for managing a network constructed and operative in accordance with a preferred embodiment of the present invention, FIG. 3 is a simplified flowchart illustration of a preferred mode of operation for the change manager of FIG. 1.

FIG. 16 is an illustration of a typical VNS Main Screen with a VLAN recommendation.

FIG. 19 is an illustration of a typical Station Port to VLAN Screen.

FIG. 20 is an illustration of a typical Novell Client to File Server Attachment Screen.

FIG. 21 is an illustration of a typical VLAN configuration suggestion in which more than one subnet is assigned to the same VLAN.

FIG. 22 is an illustration of a typical VLAN configuration suggestion that has been edited to assign each subnet to a different VLAN.

FIG. 23 is an illustration of a typical VNS Main Screen.

FIG. 25 is an illustration of a typical Reserved Ports Screen.

FIG. 28 is an illustration of a typical Switch Port to VLAN Screen.

FIG. 29 is an illustration of a typical Station to Network Screen.

FIG. 30 is an illustration of a typical Novell Server to Client Screen.

FIG. 34 is a screen generated by the software embodiment of Appendix A for a network including 4 IP subnets and 3 IPX networks.

Figure 2A:
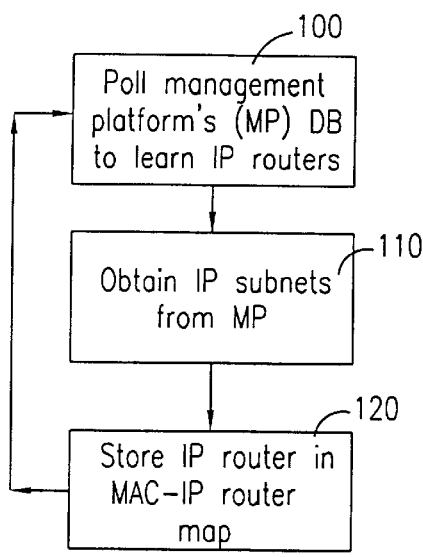
FIGS. 2A–2E are simplified flowchart illustrations of 5 subprocesses which, when performed simultaneously or in parallel, together define a preferred mode of operation for the network configuration learning unit of FIG. 1.
Figure 2B:
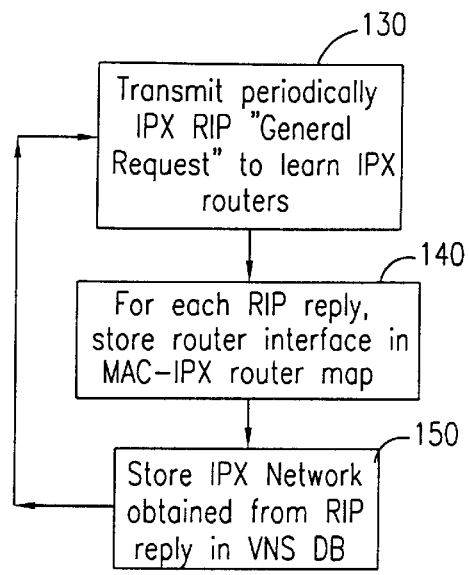
Figure 2C:
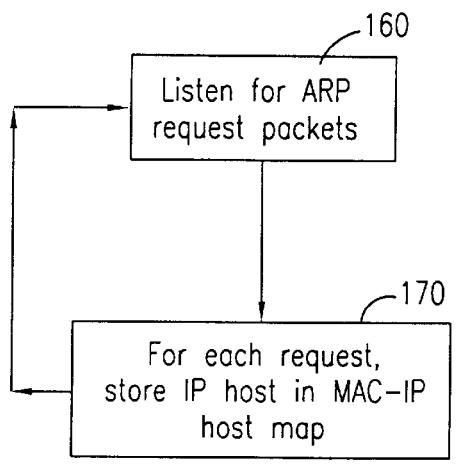
Figure 2D:
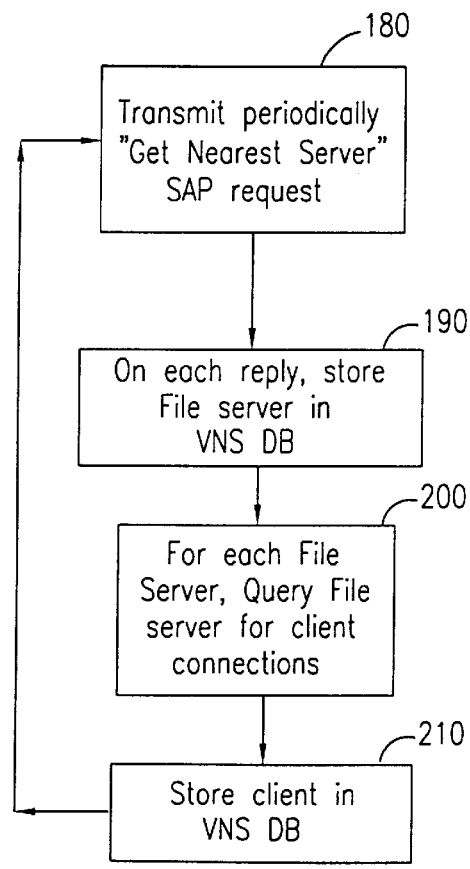
Figure 2E:
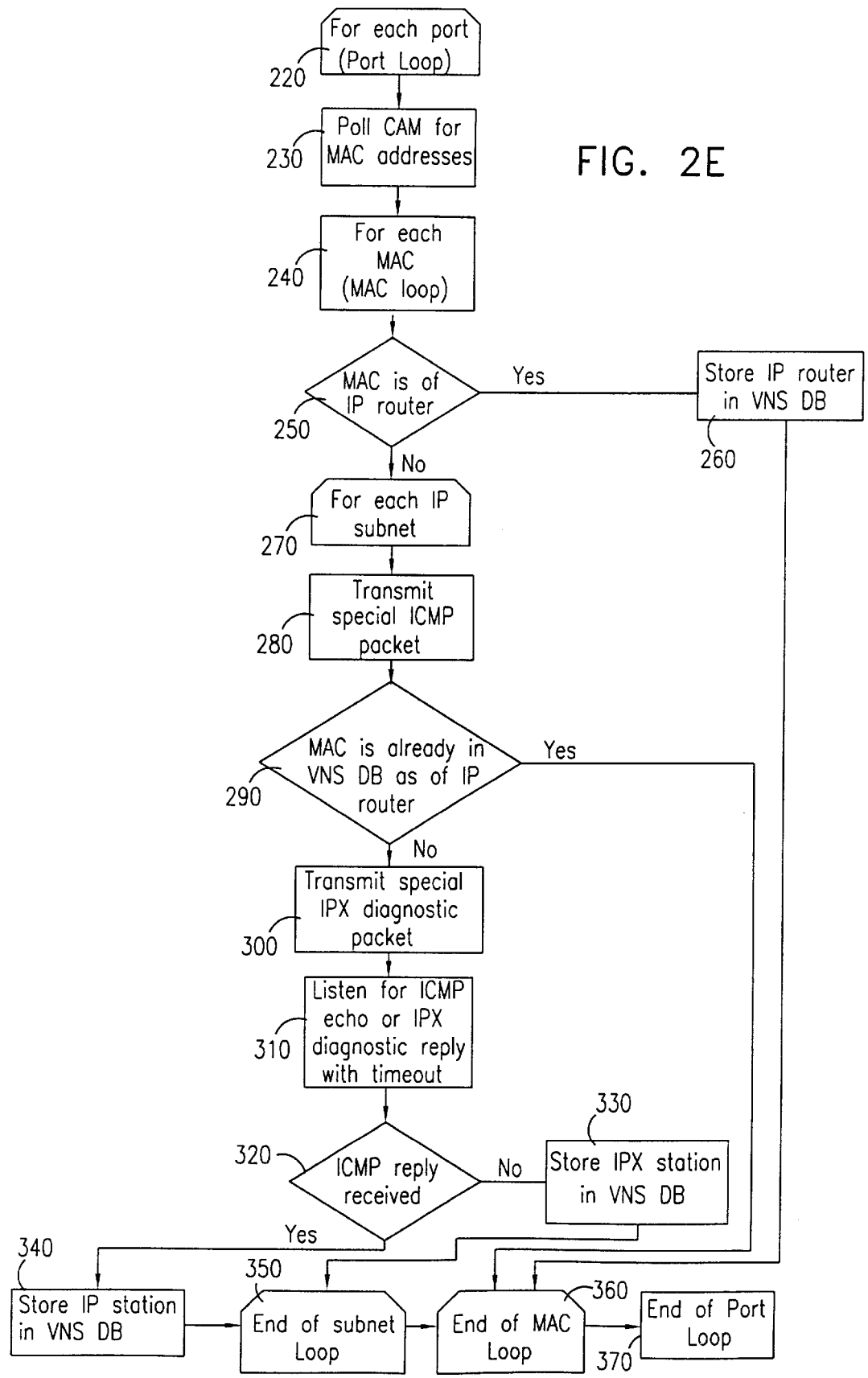

Attached herewith is the following appendix which aids in the understanding and appreciation of one preferred embodiment of the invention shown and described herein:

Appendix A is a set of computer listings which together form a preferred software implementation of a network layout detecting method constructed and operative in accordance with a preferred embodiment of the present invention

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIG. 1 is a simplified block diagram of a network 10 and apparatus 20 for managing a network constructed and operative in accordance with a preferred embodiment of the present invention. The network typically comprises a switching skeleton including at least one switching hubs interconnected by a switch backbone, each switching hub including at least one port and a plurality of end-stations each having a unique physical address and each communicating with an individual one of the switching hubs via one of the switching hub's ports, thereby defining a plurality of end-station to port connections, the plurality of end-stations including at least one router.

The apparatus 20 of FIG. 1 includes a network configuration learning unit 30 which is operative to learn the configuration of the network 10 and store information defining the configuration in a network configuration database 40. A preferred method of operation for unit 30 is described below with reference to FIGS. 2A–2E.

The apparatus 20 also includes a change management unit 50 and a VLAN assignment unit 60. The change management unit 50 is operative to monitor changes in the configuration of the network 10, and to change the configuration-defining information in database 40 accordingly. The change management unit 50 is described in detail below with reference to FIG. 3. The VLAN assignment unit 60 is operative to assign individual components of a switched routed network into virtual LANs (VLANs) based on a learned configuration of the network.

A virtual LAN (VLAN) is a broadcast domain, i.e. a plurality of end-stations interconnected by one or more switches such that the end-stations can communicate as though they were connected by a single physical broadcast LAN. Typically, a VLAN is a set of ports characterized in that packets sent by an individual end-station connected to a port belonging to the individual VLAN can be transmitted to end-stations connected to a port which is not within the same VLAN, only via a router.

The operation of VLAN assignment unit 60 is described in detail below with reference to FIG. 4. Generally speaking, the method comprises:

a. dividing the plurality of end-stations of the network 10 into nodes, wherein each node comprises a set of at least one end-station;

b. connecting each first and second node from among the nodes with an arc if at least one of the end-stations in the first node set is associated with the same port as at least one of the end-stations in the second node set, thereby to generate at least one disconnected graphs;

c. allocating a VLAN to each of the at least one disjoint graphs characterized in that broadcast packets sent by an individual end-station connected to a port belonging to an individual VLAN are transmitted only to end-stations connected to one of the ports within the same VLAN.

Reference is now made to FIGS. 2A–2E which are simplified flowchart illustrations of 7 subprocesses which, when performed simultaneously or in parallel, together define a preferred mode of operation for the network configuration learning unit of FIG. 1. Each of the subprocesses of FIGS. 2A–2E is preferably defined as an object within the network configuration learning unit 30 of FIG. 1.

FIG. 3 is a simplified self-explanatory flowchart illustration of a preferred mode of operation for the change manager 50 of FIG. 1.

Figure 4:
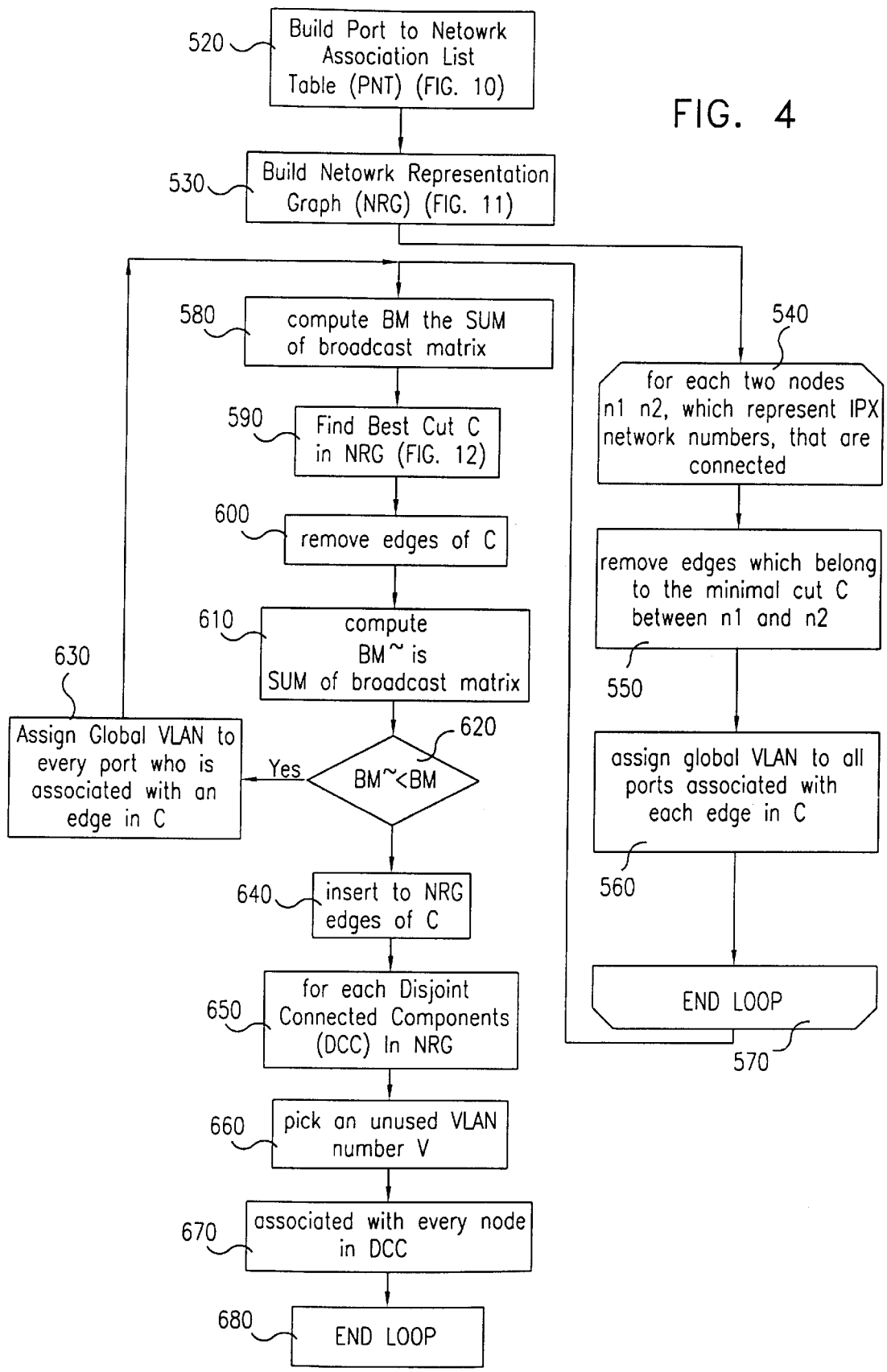
FIG. 4 is a simplified flowchart illustration of a preferred mode of operation for the VLAN assignment unit of FIG. 1.
Figure 10:
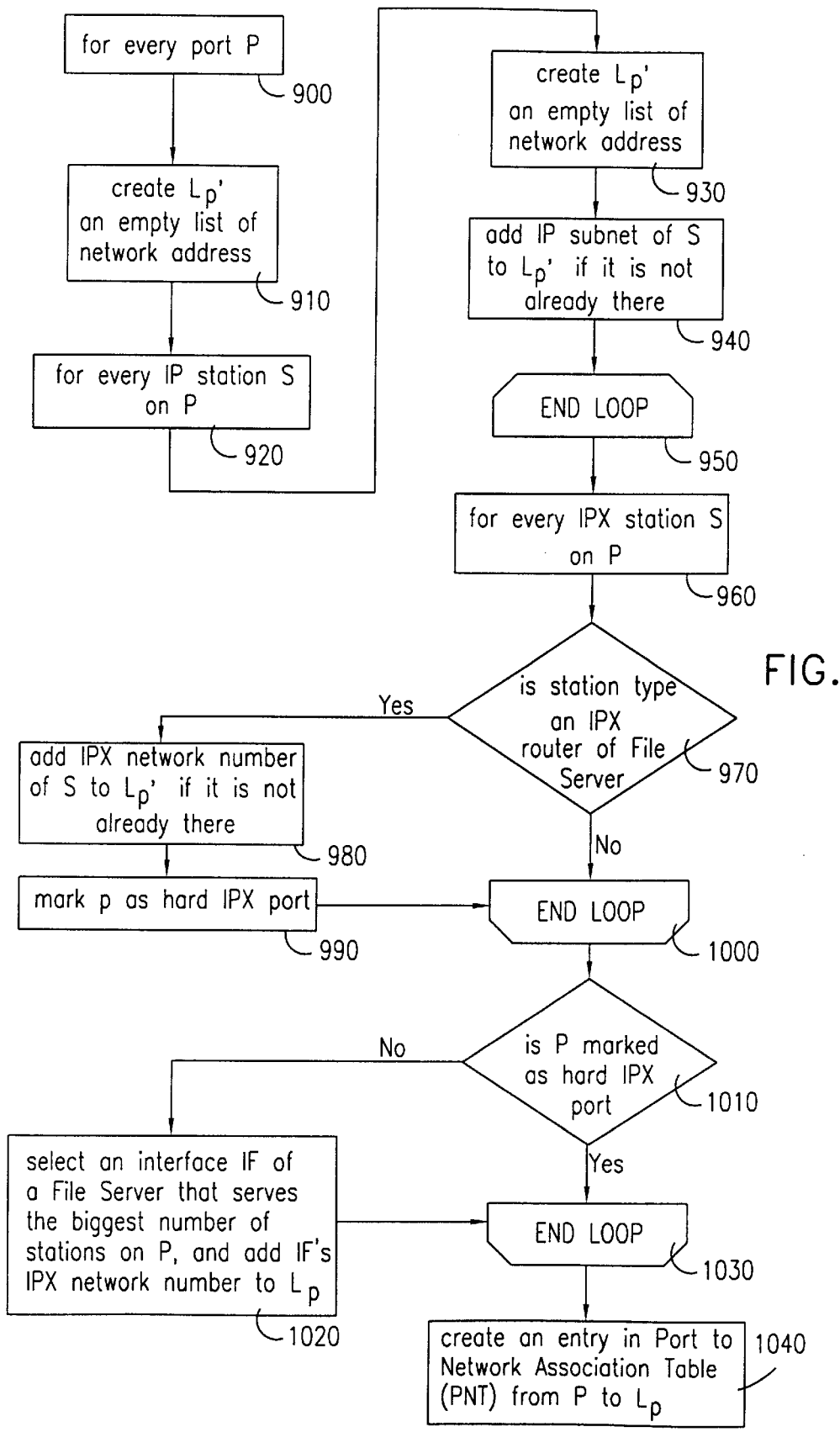
FIG. 10 is a simplified flowchart illustration of a preferred mode of operation for the "build port to network association list table" block of FIG. 4.
Figure 11:
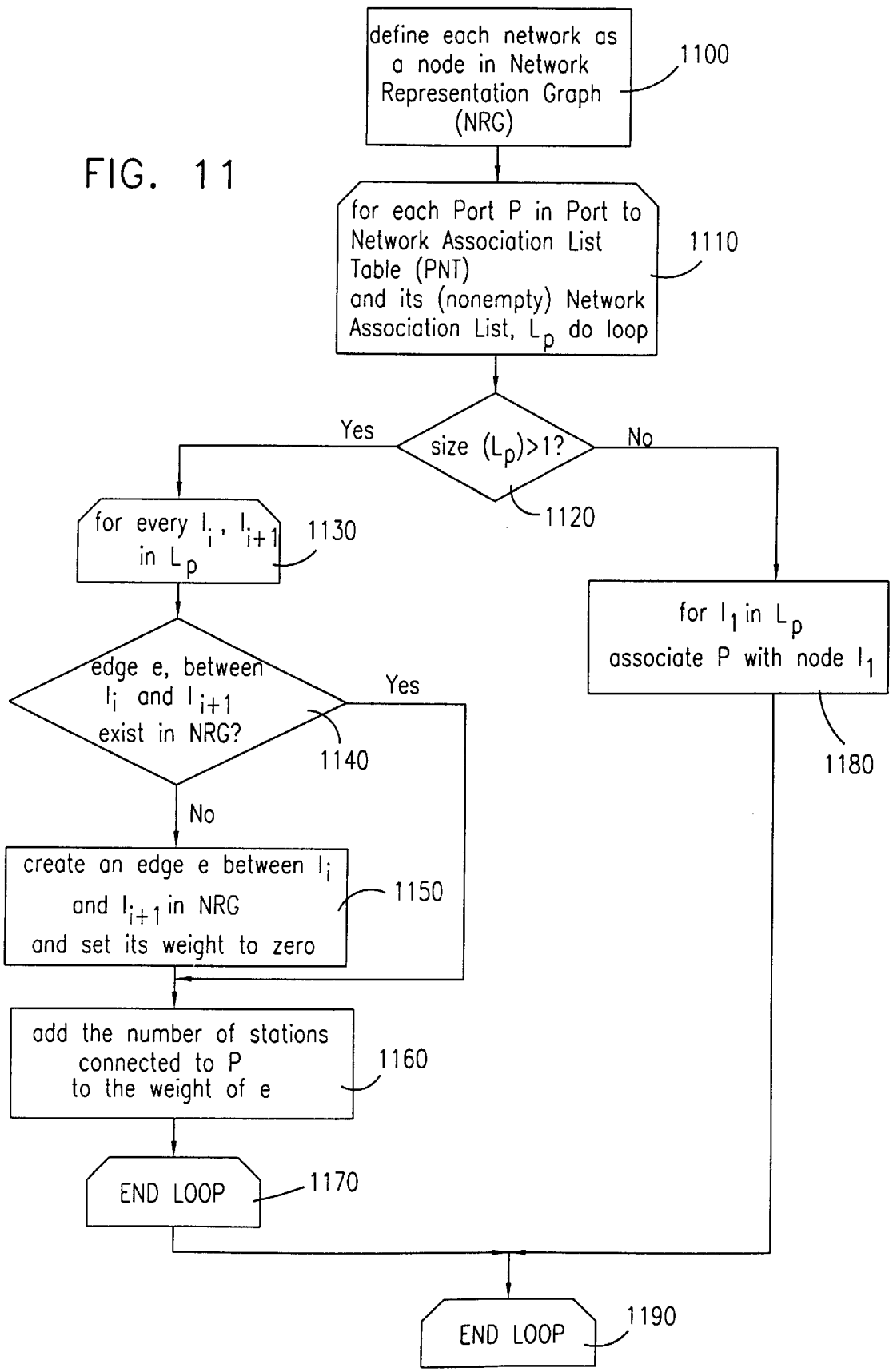
FIG. 11 is a simplified flowchart illustration of a preferred mode of operation for the "build network representation graph" block of FIG. 4.
Figure 12:
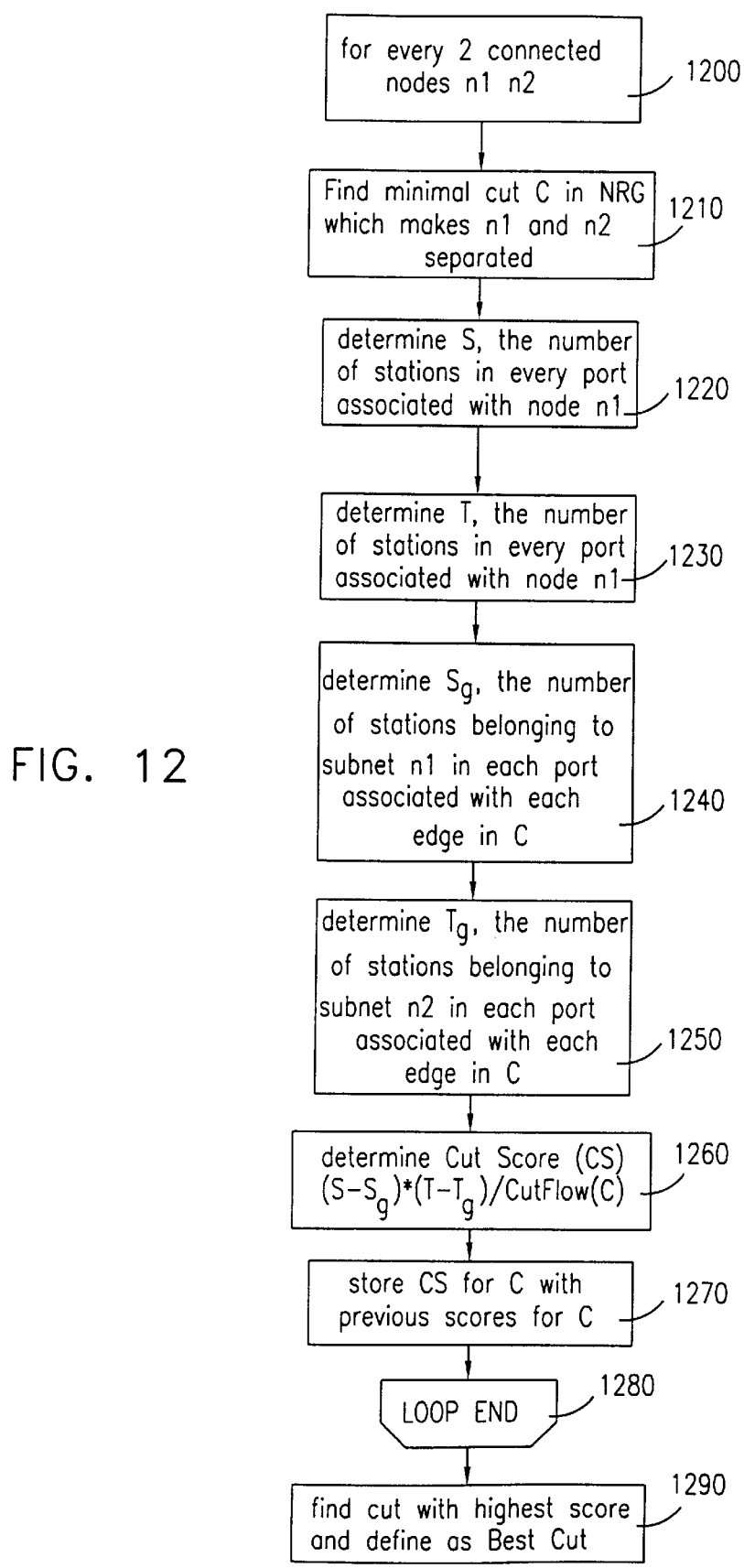
FIG. 12 is a simplified flowchart illustration of a preferred mode of operation for the "find best cut in network representation graph" block of FIG. 4.

FIG. 4 is a simplified self-explanatory top-level flowchart illustration of a preferred mode of operation for the VLAN assignment unit 60 of FIG. 1. FIGS. 10–12 are simplified self-explanatory flowchart illustrations of preferred modes of operation for the "build port to network association list table", "build network representation graph" and "find best cut in network representation graph" blocks, respectively, of FIG. 4.

A detailed description of a network managing system which assigns each component of a network to VLANs, as described above, is now provided.

0.1. Scope

This section describes the specifications of Virtual Network Server—an application intended to perform automatic Virtual LAN configuration in IP and Novell networks. Besides general function of the application and implementation specification, the section describes different cases of network configuration, explains networking software behavior and defines a set of rules for Virtual LAN assignment, especially for Novell network.

0.2. Abbreviations

The following abbreviations will be used in this section.

VLAN—Virtual LAN
VNS—Virtual Network Server
IPSN—IP Subnetwork
IPX—Internal Packet eXchange
IPXN—IPX Network
SAP—Server Advertisement Protocol
RIP—Routing Information Protocol
NCP—NetWare Core Protocol
ARP—Address Resolution Protocol
RARP—Reverse Address Resolution Protocol
DB—Database
MAC—Media Access Control
IP—Internet Protocol RIP—Routing Information Protocol
CAM—Content Addressable Memory
ICMP—Internet Control Message Protocol
—Device Manager, as described in the user-manual of the MultiMan application, commercially available from Madge
NIC—Network Interface Card
SNMP—Simple Network Management Protocol C1, C2, S1, S2 etc. are examples of Novell end-stations, where C means client and S means server.

Management Platform is a commercial network management application that provides general network management services. An example of Management Platform is HP/Open View (HP/OV) commercially available from Hewlett-Packard.

Madge applications such as TerrainMaster, VNS, etc. are integrated into HP/OV.

0.3. Overview

Virtual LAN has become a powerful facility for logical network division implemented on the physical layer. The main problem for the network manager who wants to use VLANs, is the hard work of VLAN configuration. The network manager may perform the VLAN assignment manually for all LANSwitch ports to which the stations are connected. This work may be done in two phases: first on network initialization (a one-time process but very hard) and second on a station logical address or physical connection change that is difficult to follow and during which is difficult to reassign the VLAN without destroying previously defined configuration.

Virtual Network Server comes to perform automatic VLAN configuration in a switch/routing environment. The main goal of this configuration is to achieve compliance with existing logical network division on Layer 3 of OSI model. The optimal solution would be to configure the VLANs for all Layer 3 protocols. The first VNS release is implemented for IP and Novell networks only.

As the network manager's work on VLAN configuration is done in two phases, the VNS also performs its work in two phases: initialization and change management. In initialization phase, the VNS scans the network and builds a table that maps IP Subnets/Novell servers and their clients to the VLAN. According to this table, VLAN assignment is performed to relevant LANSwitch ports. Then the VNS listens for changes such as station moves, station IP address changes, Novell servers IPX Net changes, etc. and reassigns the VLAN to the port at which the change occurred.

The VNS obtains necessary information from the management platform, from DM and from Novell servers directly. The change management is performed by listening for broadcasts transmitted by the stations that lost connection and for traps sent by management agents on changes which occurred in the LANSwitch port.

1. Agent

In order to provide fast CAM polling and efficient change management, the following feature of the agent software is implemented. The agent receives from the sensor of the LANSwitch card the trap which indicates CAM content change. (The trap sending is already implemented in the sensor software of all released LANSwitch modules) When this trap is received, the agent updates the value of the MIB variable lseIntPortCAMLastChange by current sysUpTime and send configuration change trap to the console. The exact MIB variable definition and trap format are described in 2.1 and 2.2.

The CAM change indication is implemented in the network management agent.

2. MIB Support 2.1. Madge MIB

The MIB variable lseIntPortCAMLastChange is used by Madge MIB for VNS support. It indicates CAM content change. This variable has TimeTicks type and contains the value of sysUpTime for the moment the CAM content change is detected.

2.1.1. MIB Summary

The following table summarizes the new Madge MIB item used by the VNS application.

| # | MIB item | Notes | Type |
|---|---|---|---|
| 1 | lseIntPortCAMLastChange | The value of sysUpTime at the time of CAM change detection | TimeTicks |

2.2. Traps

When the value of lseIntPortCAMLastChange is changed, the agent sends the configuration change trap, containing this MIB variable. The following is a preferred format of the trap.

```
lseIntPortCAMLastChange TRAP-TYPE ENTERPRISE lntBoxI-
    dent VARIABLES { lseIntPortCAMLastChange } DESCRIP-
    TION "This trap reports of the occurred configuration changes.
    It is enabled/disabled by chLntAgConfigChangeTraps." ::=1
```

3. Console 3.1. General Principle of VLAN Assignment

As mentioned in the Overview, the main goal of the VNS is to achieve compliance between the logical network division on Layer 3 and the Virtual Networks. Therefore, the general principle of VLAN assignment is:

Logical Subnetwork=VLAN

For an IP network, this means that the stations belonging to the same IP subnet may get the same VLAN assignment. The optimal VLAN configuration for an IP network is to put each IP subnet on its own VLAN. However, it may happen that several IP subnets are on the same VLAN.

For a Novell environment, this means that a Novell server and the clients logged into it may get the same VLAN. In real life, the rules that the VNS respects are based on but not identical to the general principle of VLAN assignment.

3.2. VNS Station Configuration and Function Example

The VNS may get packets transmitted by the stations that reside on different VLANs. It may have the possibility to talk directly to these stations (not via the router). Therefore, it may be connected to the port configured on the Global LAN.

In order to provide direct dialog between the VNS and IP stations on an IP layer and over it, an IP source address of the packets sent by the VNS may belong to the IP Subnet of the destination station. That is to say, we may support multiple IP addresses for one Ethernet interface of a VNS station. Due to the requirement that an IP address may be unique for the network, the user may manually define the IP addresses for each IP subnetwork (IPSN) defined in the network.

For Novell processing, the VNS acquires information from the servers and IPX routers. Server connections are acquired directly from the server. Therefore, no special setting of the VNS station is needed for Novell processing and the only requirement is a global VLAN assignment.

Figure 5:
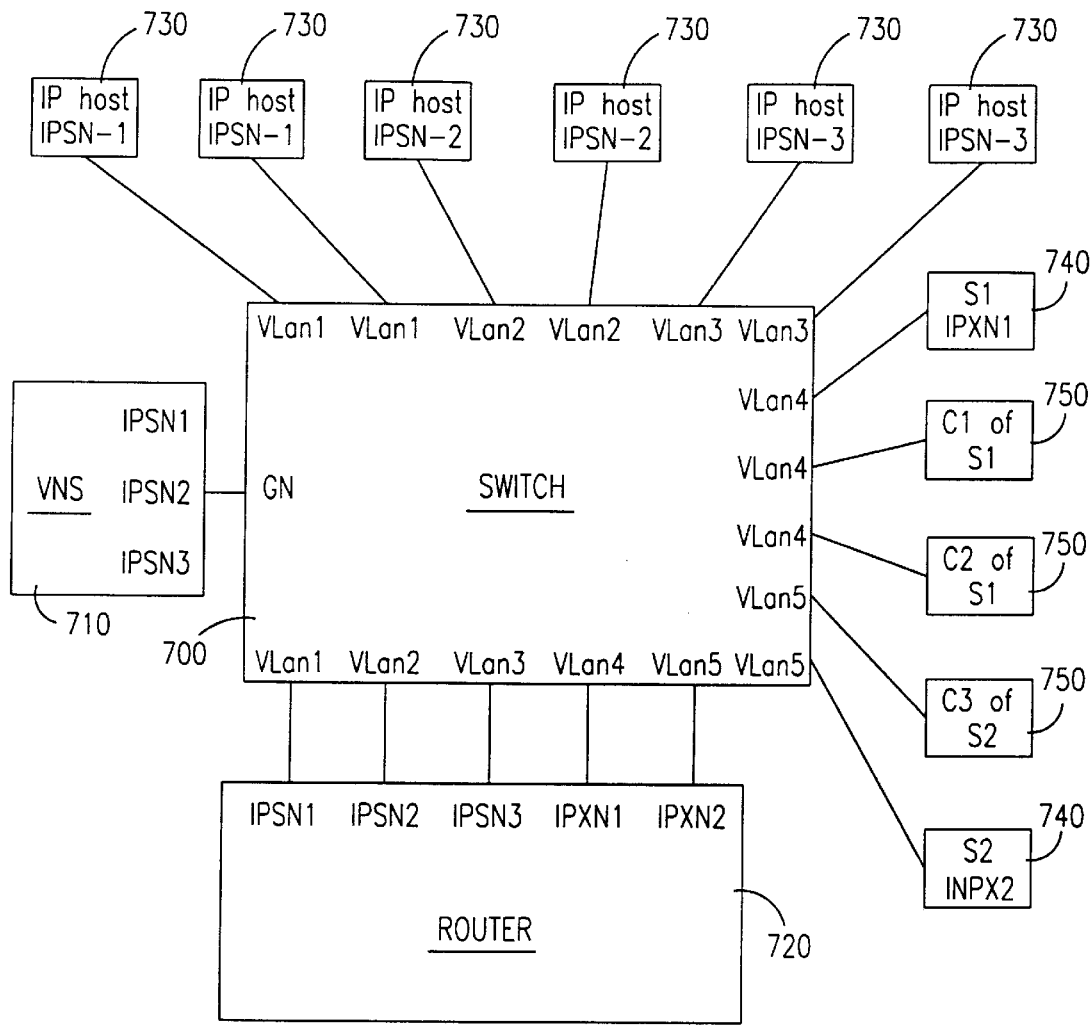
FIG. 5 is a simplified block diagram illustration of a network and an end-station on which software apparatus for managing the network may be run, the diagram also including VLAN assignment information generated by the software apparatus.

FIG. 5 represents the VNS configuration and the result of its work in a mixed IP/Novell network.

In this example, there are three IPSNs and two IPXNs divided by the router.

Server S1 is configured on IPXN1 and has two clients: C1 and C2.

Server S2 is configured on IPXN2 and has one client C3.

The VNS supports three IP addresses on its interface which is connected to the port on Global Network. The result of VNS work is VLAN1 assignment to the stations and to the router interface that belongs to IPSN1, VLAN2 to IPSN2, VLAN3 to IPSN3, VLAN4 to IPXN1 and VLAN5 to IPXN2.

3.3. Operational Modes

As mentioned in the Overview, the VNS functions in two phases: initialization and change management.

There are two operational modes of the initialization phase:
1. Net to VLAN learning
2. Net to VLAN optimal proposition In the Net2VN learning mode, the VNS acquires the current VLAN assignment of the LANSwitch ports. IP and Novell stations are connected to these ports and build a Net2VN mapping table according to the acquired information.

In the Net2VN proposition mode, the VNS builds the optimal Net2VN mapping table according to the methods described below. The proposition mode is the default mode of initialization.

A Net2VN table is displayed to the network manager who can modify it. Afterwards, the user may activate the VLAN's assignment. The VNS saves the table in a file, also termed herein the /usr/mmov/Save/vns.map file and perform the VLAN's assignment accordingly.

After initialization, the VNS automatically passes into the change management phase. There are two operational modes in this phase:
1. Automatic change
2. Confirmed change In the automatic change mode, the VNS performs the VLAN reassignment without the user's intervention.

In the confirmed change mode, the VNS displays the pop-up window showing to the user the expected changes associated respectively with confirmation and cancellation. The VLAN assignment is performed only after user's confirmation. The confirmed change mode is the default mode of change management.

The user is able to modify the Net2VN table and to restart initialization at any moment.

UI is provided for changing the operational modes and for Net2VN table modification.

3.4. Interaction with User

The VNS is implemented as an automatic system, doing its job "silently", almost without the user's intervention. Nevertheless, there are some actions that the user can perform in order to refine the VNS and to follow up on errors and actions resulting from the VNS. The User Interface of the VNS provides the following features: initialization activation, Net to VLAN table confirmation and change, definition of reserved LANSwitch ports, backbone ports list, pop-up window for information and error messages and confirmation window for VLAN assignment confirmation or cancel.

3.5. Managing LANSwitch Parameters

The basis of VNS work is LANSwitch configuration learning and managing. The VNS polls and gets updates on the set of configuration parameters and stores them in its database.

The station connection information is obtained from CAM content. The station is considered to be connected to some LANSwitch port if its MAC is detected in the CAM of this port. It may be that in most cases each MAC is detected in the CAM of only one LANSwitch port. If any one MAC is detected in the CAM of more than one port, the VNS performs CAM reset for these ports in order to get unique MAC appearance only in the right port.

A VLAN is assigned to a LANSwitch port by performing an SNMP Set of the following MIB variables: (lseIntPortRoutingMode to "Network Routing") and (genIntPortBusConnNumber to VLAN number or lseIntPortGlobalMode to "On" for global VLAN). Even if a successful SNMP Response is received, the VNS may verify that the Set has really succeeded. If the Set did not succeed, the VNS repeats it. This procedure is repeated three times. If it fails after the fourth time, the VNS informs the user.

As it was already mentioned, the LANSwitch port to which the VNS is connected, must be in Global mode. If it is not, the VNS configures it so that it is. If, during the work, the VNS detects that the Global mode of its port is switched off, it tries to fix this. If it fails, the user is informed and the VNS stops its work.

The following table summarizes the MIB variables that may be acquired and how the VNS uses them.

| MIB Variable | Usage |
| --- | --- |
| genGroupAutoManual | Determine, if the VLAN assignment is possible |
| lseGroupBackbone12 | If the value is "On", do not learn the CAM of ports 1 and 2 |
| lseGroupBackbone34 | If the value is "On", do not learn the CAM of ports 3 and 4 |
| genIntPortAdminStatus | Determine, if LANSwitch Port is active |
| genIntPortBusConnNumber | Get and set the VLAN number |
| lseIntPortRoutingMode | Get and set the VLAN (set value "Network Routing") |
| lseIntPortGlobal | Get and configure the port on the global VLAN (set value "On") |
| lseIntPortIOMode | If the value is "On", do not learn the CAM of the port |
| lseIntPortMACAddTable | Get CAM content, i.e. MAC addresses of connected stations |
| lseIntPortCAMLastChange | Get indication of CAM content change |

3.6. IP Network
3.6.1. General Functions

The VNS identifies and polls the LANSwitch modules and the ports configuration, including CAM content (i.e. MAC addresses of connected stations). This information is obtained from management agents and stored in a VNS database. For each MAC detected in the CAM, the VNS tries to get a corresponding IP address from the management platform. If the management platform does not recognize the device, the VNS uses its special MAC to IP address resolution procedure to get the IP address (see 3.6.2). Then the IPSNs are taken from management platform. Using this information, the VNS activates a procedure that builds a table mapping all IPSNs to vlans (see 3.6.3). This table is displayed to user who can confirm or modify it. Afterwards, the vlans are assigned to all relevant LANSwitch ports according to the table.

The VNS detects new stations, moved stations and stations whose IP address was changed via the CAM change trap sent by the management agent and by listening for frequent ARP requests sent by stations which are unable to connect. The VNS reassigns the VLAN to the station's port according the above-mentioned table. If the new VLAN assignment contradicts an old one in that there are other stations connected to the same port, the assignment is performed as described in 3.6.4 (change management)

3.6.2. MAC to IP address resolution

The basis of VNS knowledge about the stations (i.e. MAC addresses of the stations) in the network is the content of the LANSwitch CAM connected to the LANSwitch ports. In order to acquire the IP addresses for LANSwitch port, the VNS may get an IP address for each MAC address. This function is especially critical for change management when the operation of acquiring an IP address for a MAC may be fast (couple of seconds).

The VNS uses its own method to solve the problem. For each IPSN, a special ICMP packet is sent with destination Ethernet address equal to the MAC address, whose IP we are looking for. The destination IP address is the IP broadcast address of the IPSN we are dealing with. The source IP address is the VNS IP address on this IPSN. Generally, all the IP stations in the subnet reply to an IP broadcast because in standard implementation, it is sent to the Ethernet broadcast address, i.e. FF:FF:FF:FF:FF:FF. In our case, only necessary stations reply because the packet is sent to them as a unicast and the VNS obtains its IP address from the IP header of reply.

3.6.3. Initialization Phase in IP Network

Now, using the procedures defined above, we can specify the initialization procedure.
1. Identify and poll the management agents for the LANSwitch CAM, updating the VNS database.
2. Acquire the IPSNs from the management platform's database.
3. Store IPSNs in VNS database.
4. For each MAC address acquired from CAMs, get an IP address from the management platform.
5. If there is no MAC in the management platform's database, get an IP according to the MAC to IP address resolution procedure see 3.6.2.
6. Build an IPSN to VLAN map and a Port to VLAN map according to FIG. 4.
7. Display the map to the user for confirmation or modification.
8. Perform the VLAN assignment according to the Port to VLAN map generated in step 6.

3.6.4. Change Management in IP Network

A change in the IP network is defined as one of the following cases:
1. A new host appears
2. An existing host changes its IP address
3. A host moves to another port during the work (if a host is powered off and then moved, we consider this to be the case of new host)
4. A new IP Subnet is added When a change occurs, the VLAN may be reassigned to the relevant port. A contradiction may occur during the change. For example, the VLAN of the station that caused the change, obtained from the IPSN2VN map, may contradict the previous VLAN assignment of the port due to other stations connected to the same port which already have a VLAN.

The system operates as follows: if there is no contradiction, assign the VLAN according to the IPSN2VN map. If there is, assign the global VLAN to the port and inform the user.

There are two sources of change detection: CAM change trap sent by management agent (see 2.2) and periodic frequent ARP requests sent by the station which connectivity problems. ARP requests are considered to be frequent if they are sent more than 5 times within 10 seconds. Such ARP requests are sent by a new station or the station whose IP address has been changed. A station that was moved to another port also transmits frequent ARPs but it may take up to 20 minutes until it starts to do this. Therefore, the detection basis for each case of change is:
1. New station—CAM change trap and frequent ARP requests
2. IP address change—frequent ARP requests
3. Station move—CAM change trap
4. New IP Subnet—Indication from the management platform The CAM change trap gives an exact indication of port, on which the change occurred. ARP requests indicate MAC and IP addresses of the station that lost connection, but does not, of course, indicate its port.

While handling frequent ARP requests, the VNS looks in its database for the obtained MAC address. If the MAC is not found, or is found in database, but is missing in the CAM of the port that this station is supposed to be connected to, there is nothing to do and the VNS just continues to listen for changes and to perform the polling. When the problematic MAC is detected in the CAM, the change management is performed. This case of contradiction between the database information and the CAM content means that the CAM change trap was not received.

If a new IP Subnet is added to the router, the VNS detects it from the management platform. The new IPSN is added to the Net2VN table. If there are no other stations on the port of the router's interface with the new IPSN, the new raw is added to Net2VN along with the new VLAN number. If there are other IPSNs on this port, the new IPSN is added to the raw of the Net2VN table that contains these IPSNs.

The following change management process handles all the types of change.
1. Listen for CAM change traps.
2. Listen for frequent ARP requests.
3. When a CAM change trap is received:
   3.1. Acquire the CAM of the port specified in the trap.
   3.2. Update CAM content in the VNS database.
   3.3. Compare the new CAM with the one registered in the VNS database.
   3.4. If there is no new MAC, then some station was deleted from the CAM. Go to 1.
   3.5. Get IP address for the MAC according to the MAC to IP resolution procedure (see 3.6.2)
   3.6. Go to 6.
4. When frequent ARP requests are detected:
   4.1. Get MAC and IP addresses from the ARP packet.
   4.2. Look in the VNS database for the MAC and the port and connect them.
   4.3. If MAC is not found, Go to 1.
   4.4. Acquire the CAM of the port and compare the new CAM with the CAM registered in the VNS database.
   4.5. If the CAMs are identical (IP address change case), go to 6.
   4.6. Update the CAM in database.
   4.7. If there is no MAC in the new CAM, Go to 1.
   4.8 Go to 6.
5. When the new IPSN is registered by the management platform:
   5.1 If there are other IPSNs on the port of the relevant router interface, add the IPSN to the raw of the Net2VN table with these IPSNs.
   5.2. Otherwise, add the new raw to Net2VN table.
   5.3. Go to 6.
6. Assign the VLAN according to the following rule: if there is no contradiction, assign the VLAN according to the IPSN2VN map. If there is, assign the global VLAN to the port and inform the user.

7. Go to 1.

3.7. Novell Network

3.7.1. General Principles

Novell network configuration principles and the method of their implementation in a switch/routing environment are different from those in IP network. In a normal Novell environment different IPX Nets cannot be defined on the same Switch Fabric without vlans just as they can not be defined on the same Ethernet segment. If such a configuration is defined, the Novell servers periodically point out the IPXNs contradiction and do not recognize each other. This means that the user who initially connected to one server cannot log into another server even though they are connected physically.

The only way to use routing in a switched Novell Network is working with vlans. The network manager may configure manually the IPXNs for each interface of all servers/routers. Then the VNS performs the VLAN configuration for all Novell servers, routers and stations.

As mentioned above, servers'/routers' interfaces with different IPXNs cannot work properly on the same physical segment because they mistakenly receive each other's messages. On the other hand, the server/router interface with the same IPX Net may get the same VLAN so that they can communicate directly. That leads us to the following two rules of VLAN assignment:

Rule 1: Server/router interfaces can not be in Global mode

Rule 2: For server/router interface: One and Only One IPX Net=VLAN

As in an IP Network, a workgroup consists of users who belong to the same IP Subnet. In a Novell Network a workgroup consists of the server and the users that logged into this server. Therefore, the general principle of VLAN assignment for Novell stations is:

Station VLAN=Server VLAN

Novell users can log into one server and then attach to up to 7 other servers. It is impossible to pre-define which servers the client will use most often. Therefore, for each port a dominant server is defined as the server with the largest number of clients from among the Novell stations connected to that port. Thus, we can state the following rule for station VLAN assignment.

Rule 3: Station VLAN=Dominant Server VLAN

3.7.2. VLAN Balance for Multiple-NIC Server

A Novell server may have more than one NIC. For proper NetWare functions, every NIC may be configured on a different IPXN. If the dominant server has more than one NIC, its client may get the proper VLAN assignment according to any NIC assignment. In order to balance the traffic between the NICs, the following simple balance principle is used: each NIC has an equal number of clients. The VLAN assignment rule is:

Rule 4: Station VLAN=VLAN of Dominant Server's NIC with Minimum Stations

For example, if the server has two NICs, the first client gets the VLAN of the first NIC, the second client gets the VLAN of the second NIC, the third—of the first NIC, the fourth—of the second NIC, etc.

3.7.3. VLAN Assignment Example

Figure 6:
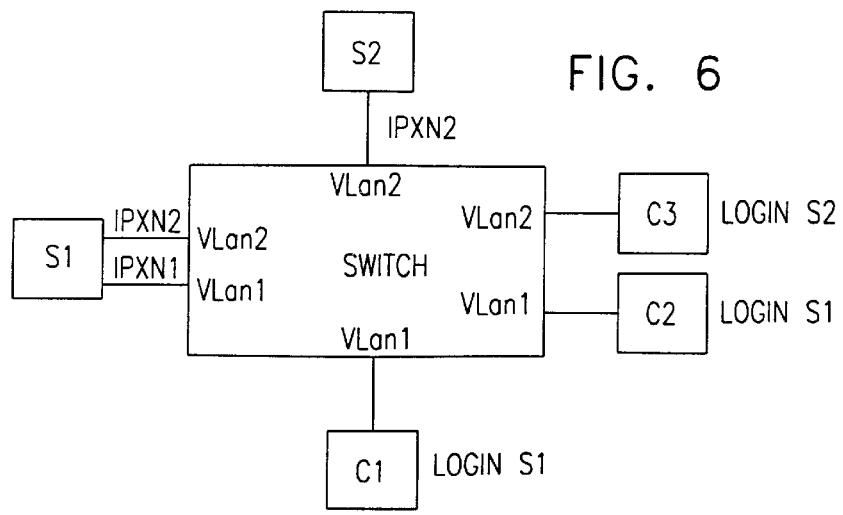
FIG. 6 is a simplified block diagram illustration of a VLAN assignment generated by the software apparatus shown and described herein, for a Novell network.

FIG. 6 illustrates VLAN assignment in the Novell network. Assume that the Novell network contains two servers, S1 and S2, and three clients: C1, C2 and C3. Server S1 has two NICs: the first configured on IPXN1 and the second on IPXN2. Thus, S1 is both a server and a router. Server S2 has one NIC which is configured on IPXN2. At the first stage the VNS assigns vlans to all server NICs according to the table:

| IPXN | VLAN |
| --- | --- |
| 1 | 1 |
| 2 | 2 |

Stations C1 and C2 are logged into S1, and C3 into S2. The VLAN assignment is performed in the following way. C3 gets VLAN2 according to the VLAN assignment of S2, its dominant server. C1 and C2 may be put on VLAN1 or VLAN2 because their default server S1 can be reached on both VLANs. According to rule 4, we must distribute the clients evenly. Therefore C1 is put on VLAN1 and C2 on VLAN2.

3.7.4. Problematic Connection Cases

Following are some cases of wrong or non-optimal connection of servers/stations to LANSwitch ports.

3.7.4.1. Servers on the Same Port

If more than one server interface, with different IPXNs, are connected to the same port, it is impossible to assign different VLANs to them because the LANSwitch port can get only one VLAN. Such a situation is problematic. Therefore, the following rule is checked by the VNS.

Rule 5: Server/router Interfaces with Different IPX Nets Can Not be on the Same Port The VNS detects any violations of Rule 5 and announces them to the network manager. The announcement makes the network manager aware of any connection problems. For example:

The servers DEVEX with IPX Net 2 and EMBEDDED with IPX Net 10 are connected to the same LANSwitch port: Hub LannetA, slot 2, port 1. Please, connect them to different ports.

3.7.4.2. Clients of different servers on the same port

If, according to the VLAN assignment systems described above, several stations get different VLANs and they are connected to the same port, a minimal hops procedure is implemented to define an optimal VLAN configuration. If there are routes from any station to its server, then any station can reach its server on any VLAN. In this case the rule of VLAN assignment is:

Rule 6: On one Port—Minimize the Sum of the Hops Needed for Each Station to Reach the Server The minimal hops principle overwrites the balance principle, because balance cannot be implemented for stations on one port.

Figure 7:
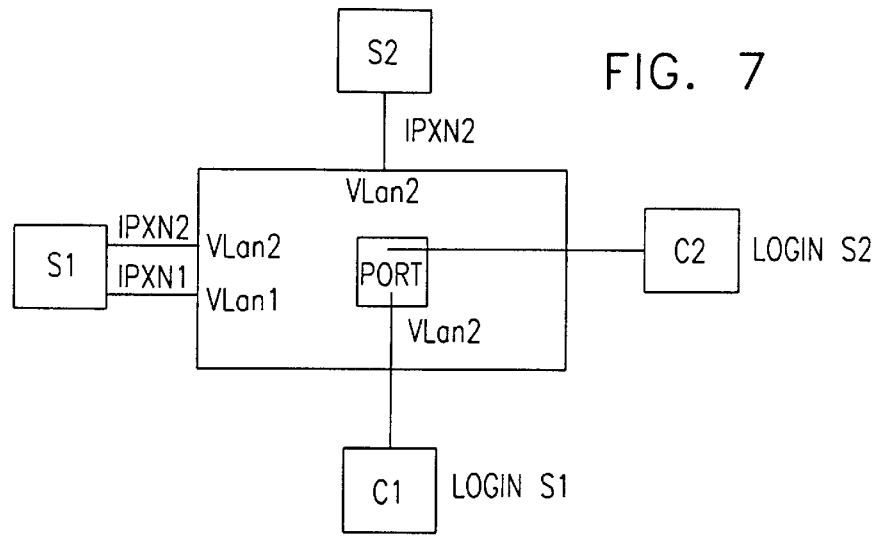
FIG. 7 is a simplified block diagram illustration of a VLAN assignment generated by the software apparatus shown and described herein, for a Novell network portion in which clients of different servers are connected to the same port.

In FIG. 7 C1 logged into S1, C2 in S2. C1 and C2 are connected to the same port. Both VLAN1 and VLAN2 are good for proper connectivity. If VLAN1 is assigned to the port, the station C1 reaches S1 directly and C2 reaches S2 via S1. If VLAN2 is assigned, both C1 and C2 reach their servers directly. According to the minimal hops principle, VLAN2 is chosen.

The following chapter is intended to explain what happens when the clients of the servers with different IPXNs are connected to the same port and there is no route between these IPXNs.

3.7.4.3. No-route Case

When the station tries to enter the network, it broadcasts a "Get Nearest Server" SAP request and establishes an initial connection with the first server to reply. Then it can log into any other server which is known to this "nearest" server. If there is no route between servers with different IPXNs (and different VLANs, according to Rule 2), they do not know each other. The station can log only into the server with which it made initial contact and with the servers known to the initial server. The only way to ensure that the station will log into the necessary server is to define a preferred server in the initial configuration file of the station using the preferred server shell. When the preferred server is defined, the station waits for the "Give Nearest Server" response from the preferred server.

In the no-route case, the station can reach the server only if it has the VLAN of the server or it is in Global mode. Thus, the right way to work in the no-route case is to define a preferred server for the station and to put the station on the server's VLAN. Preferred server definition can be done only by the network manager. VLAN assignment is done by the VNS.

Figure 8:
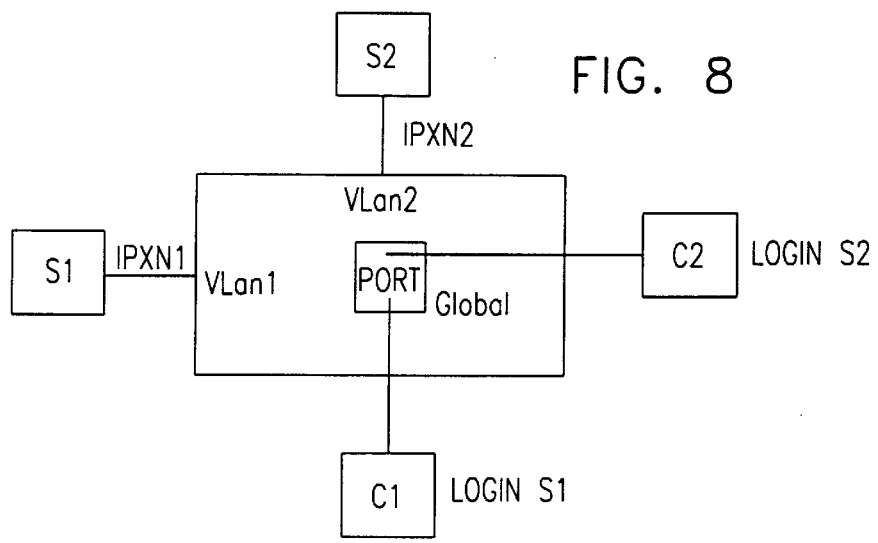
FIG. 8 is a simplified block diagram illustration of a VLAN assignment generated by the software apparatus shown and described herein, for a more complex Novell network portion including servers with IPXNs between which there is no routing path.

If there is more than one station on the port that has to log into different servers which do not have routes to the other servers, the only way to provide the proper connection is to put the port on Global mode. Thus, the following rule is concluded:

Rule 7: In the "No-Route Case" Port with Different Servers' Stations may be in Global Mode FIG. 8 illustrates this case.

In this example there are no routes for C1 and C2 to reach their servers. They can reach them only directly: C1 on VLAN1 and C2 on VLAN2. If they are on the same port, the only way to connect them is Global VLAN assignment to the port.

In the "no-route" case, a new station that does not succeed to establish an initial connection is put on Global. After it has successfully logged in, it gets the VLAN of its server if there are no other stations using other servers on the same port. If there are, the station remains Global according to the Rule 7.

3.7.4.4. Station and Server on the Same Port

If a station and its server are connected to the same port, the station logs into the server successfully because it has the same VLAN as the server and the VNS has nothing to do here. If the station wants to log into a server connected to another port with a different VLAN and there is no route between these two servers, it never succeeds because the servers do not know about each other. the VNS can not detect this problem. We can just recommend to the network manager not to put on the same port a server and stations which need to work with other servers.

If there is a route between the servers, the station succeeds to log into the other server via the router and it is wrong to assign the VLAN of the second server to the station because this destroys the initial assignment of the first server which is on the same port as the station. The VNS might not change the VLAN of the port even though it would enable direct access of the station to the desired server. The following rule summarizes this issue:

Rule 8: Server VLAN Assignment Cannot be Overwritten by Station Assignment

Figure 9:
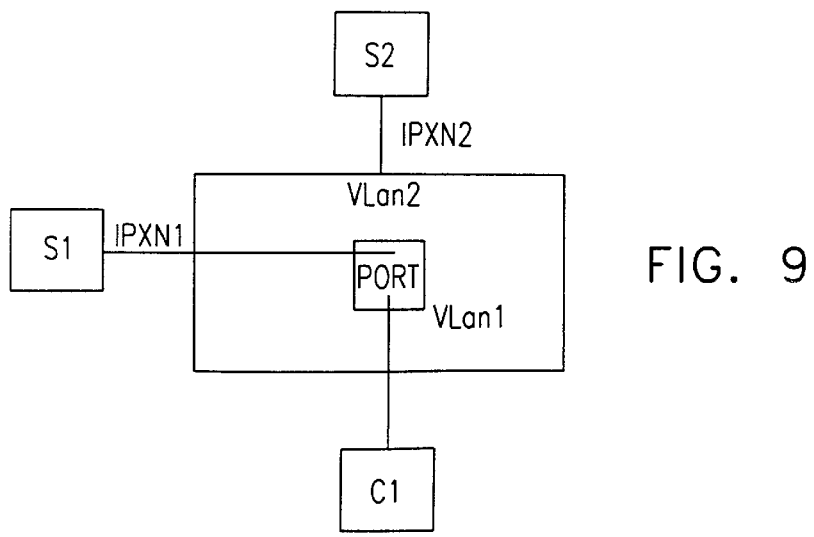
FIG. 9 is a simplified block diagram illustration of a VLAN assignment generated by the software apparatus shown and described herein, for a Novell network portion including a port to which both an end-station and a server are connected.

FIG. 9 illustrates the situation when the server and the station are connected to the same port. If the station C1 logs into server S1, it succeeds and there is nothing to do for the VNS. VLAN1 is already assigned to C1 because the server assignment has already been done. If C1 wants to log into S2 which is on VLAN2, it never succeeds because in this example there is no route from C1 to S2. C1 receives from S1 the response: "Unknown server S2". The VNS cannot detect such a situation.

3.7.5. VNS Functions in Novell Network 3.7.5.1. Servers Learning

In order to locate the Novell file servers, the VNS will periodically send "Get Nearest Server" SAP broadcasts. All Novell Servers that reply to this request will be registered by the VNS. The names, internal IPXN and external IPXN, of the servers will be obtained from the reply packet.

In order to learn the IPX routers, the VNS will periodically send "General Request" IPX RIP broadcasts. All IPX routers that reply to this request will be registered by the VNS. The IPXN of the router interfaces matched with the MAC addresses will be obtained from the reply packet.

3.7.5.2. Server Connections Learning

Server connection is the identification of the client logged into the server. (NetWare command USERLIST /A run on a client workstation provides a list of server connections.) The following parameters of server connections are used by the VNS for determining which clients are logged into the server.

| Client Parameter | Usage |
| --- | --- |
| MAC Address | Get the server of the client with MAC obtained from CAM |
| IPXN | Determine the IPXN of the client |

Server connections are identified only for the servers of type "file server". In order to identify client-server connections, the VNS will query the file servers via a "Get Internet Address" NCP request. MAC addresses and the IPXN of the clients will be obtained from the NCP replies.

3.7.5.3. Initialization

Initialization is the process of VLAN assignment to Novell servers, routers and stations, that have already logged into some server.

The following procedure is implemented on the initialization phase.

1. Identify all Novell servers/routers and routes by listening for SAP/RIP broadcasts.
2. For each server/router build an IPX Net—VLAN table according to Rule 2.
3. If Rule 1 or Rule 5 are not fulfilled, announce the user and stop.
4. For each server find all stations logged into it (see 3.7.5.2)
5. For each station:
    5.1. If there are clients of the servers with different IPXNs on the port:
        5.1.1. and it is the "no-route case", put the port on Global.
        5.1.2. Otherwise, find the optimal VLAN according to the minimum hops principle (Rule 6).
    5.2. If the server of the client has more than one NIC, assign a VLAN according to the balance (Rule 4).
    5.3. Otherwise (normal case), assign the VLAN of the default server.

3.7.5.4. Change management

Change in Novell network are defined as one of the following:

1. Adding a new server/router.
2. Moving an existing server/router
3. Changing the IPX Net of a server/router
4. Adding a new station
5. Moving an existing station (Station/server moving is defined as moving while the station/server is in use. If the station is powered off and then moved and powered on, it is handled as a new station.)

For change detection the VNS uses different Novell broadcasts and CAM change trap. As in the IP case we say that protocol requests are frequent if they are sent more than 5 times in 10 seconds and have the same content.

For server change detection the VNS listens for periodic SAP broadcasts.

For router and route change detection the VNS listens for periodic RIP broadcasts.

For detection of a station trying to establish an initial connection with the server, the VNS listens for frequent "Get Nearest Server" requests, transmitted by such stations approximately 40 times.

For detection of a station that lost its server connection, the VNS listens for frequent "RIP General Requests" transmitted by such stations approximately 40 times. To identify the server that the station is looking for it, internal IPX Net number is used. This number is extracted from the RIP General Request and the server is identified according to the information obtained from SAP broadcasts.

The CAM change trap is used as in the IP case to detect the port that the change occurred on, and to update the VNS database accordingly. No VLAN assignment is performed on the arrival of the trap because at the moment of arrival it is difficult to understand which change has taken place. If even after the change, the station is unable to connect, it is detected in one of three ways described above.

If the source of the change is a server, two cases of contradiction may occur. First, another server with a different IPX Net may be connected to the same port. Second, the stations using other servers may be connected to the same port and the new server may cause the no-route case.

The policy of server contradiction handling is: suggesting to the server to change the connection.

If the source of the change is a station, similar contradictions may occur. First, the necessary VLAN reassignment of the station may contradict the VLAN of the server residing on the same port. This case is considered to be the case of server contradiction and is treated according to the policy of server contradiction. Second, the VLAN reassignment of the station may contradict the VLAN of other stations connected to the same port.

The procedure of handling station contradictions is: if there is a route between the servers of the stations—do not change the VLAN. In the no-route case—put the station on Global.

In case of a new station that cannot get an initial connection no such contradictions can occur. If a server is connected to the station's port the station is connected to it. If other stations are connected to the port, the station is connected to one of their servers. Therefore, a new station that cannot get an initial connection with the server gets a global VLAN assignment.

The case of an IPXN change of server/router is discussed separately. Let us define two kinds of IPXN change: simple and complicated.

Simple IPX Net change is the change when some IPX Net number is changed to another number for all servers'/routers' interfaces that had it. For example, IPXN3 was changed to IPXN5 for all interfaces previously configured on IPXN3.

Any other change is considered to be complicated.

The procedure of handling an IPXN change is: if the change is simple—update the Net2VN map, if it is complicated—inform the user, recommending to perform initialization again.

Notice that after the IPX Net change, the server may be rebooted. After rebooting the server, the stations connected to it may be rebooted also.

The following is the change management procedure, including all possible changes.

1. Listen for SAP and RIP broadcasts to detect server/router changes.
2. Listen for General RIP Requests to detect the station that lost its connection.
3. Listen for Get Nearest Server broadcasts to detect any station trying to establish an initial connection with a server.
4. Listen for CAM change traps
5. When an SAP/RIP broadcast is received:
    5.1 If no changes are detected, go to 1.
    5.2 If a new server is detected:
        5.2.1 If the new server has a new IPX Net, inform the user, proposing to perform initialization again.
        5.2.2 Otherwise (the existing IPXN):
            5.2.2.1. If there are no other stations, assign the VLAN according to the Net2VN table.
            5.2.2.2 If there is a route from the new server to the servers of other stations on the port, assign the VLAN according to Net2VN table.
            5.2.2.3. Otherwise (no-route), inform the user.
            5.2.2.4. Go to 1
    5.3 If an IPXN change is detected
        5.3.1 If it is simple change, just update the Net2VN map
        5.3.2 Otherwise (complicated change), send an announcement to the user
        5.3.3 Go to 1.
6. If Get Nearest Server requests are detected
    6.1. Put the station on Global and send an announcement to the user.
    6.2. Go to 1
7. If General RIP Requests are detected (station moved to another port)
    7.1 Determine which server the station is looking for.
    7.2 If there is a server contradiction, announce it to the user.
    7.3 If there is a station contradiction, put the station on Global
    7.4 Otherwise (no contradictions), assign the VLAN of the server
    7.5 Go to 1
8. CAM change trap detected
    8.1. Perform steps 3.1-3.4 of change management for IP
    8.2 Go to 1

3.8. Mixed IP-Novell Network 3.8.1. General

A mixed IP-Novell environment has become very popular today. First, people add IP stations to Novell networks and vice versa -i.e. Novell servers and stations to IP networks. Second, TCP/IP packages are often installed on Novell servers and stations. Such a station becomes both Novell and IP node. Third, there are software packages that add to UNIX stations with native TCP/IP environment the possibility to serve as a Novell server or client, e.g. SolarNet of SunSoft.

Due to these facts, we may take care of the proper VNS functions in a mixed IP-Novell network. Taking into consideration the rules and the procedures defined above for pure IP and pure Novell environments, we can construct mixed procedures and define the VNS behavior in a mixed network.

3.8.2. Mixed Net to VLAN Mapping Procedure

A mixed IPSN-IPXN to VLAN mapping procedure is much more complicated than an IPSN to VLAN mapping procedure. The mapping procedure for a pure IP network may always succeed. A mixed procedure could fail for any of the reasons described below. If it fails, the VNS informs the user about the reason for failure and stop initialization. It is up to the network manager to change the connection and run initialization again.

The main reason that the procedure could fail is violation of Rule 2. It may happen that according to the IPSN to VLAN mapping procedure principle, different IPXNs may get the same VLAN. For example, port 1 may connect IPSN50 and the server with IPXN1, and port 2 may connect IPSN50 and the server with IPXN2. In order to provide connections for IP stations, ports 1 and 2 may get the same VLAN. On the other hand, they may get different VLANs according to Rule 2. We call such a contradiction IPSN-IPXN contradiction. There is no way to solve this contradiction and the procedure announces it to the network manager and stops.

The mixed procedure is based on division of the stations into three types: IP station, Novell server and Novell client. Each type of station gets special processing according to the following priorities.

The Novell servers have priority and are processed first. A Server2IPXN index mapping servers to their IPXNs is built and an IPXN to VLAN mapping is performed according to IPXN configuration of the servers and their connections. The result is inserted into the Net2VN and Port2VN tables.

The IP stations have second priority and are processed in the second step. The processing of the IP stations is performed by three passes. In the first pass, the ports that were assigned VLANs during server processing are handled. The IPSNs connected to these ports are added to the Net2VN table according to the IPXN to VLAN assignment. The IPSN-IPXN contradictions are checked in this pass. In the second pass the IP to VLAN mapping procedure is activated based on the previously assigned ports. In the third pass, the IP to VLAN mapping procedure is activated for still unassigned ports. Server ports are not touched here because they have been already covered in the first and second passes.

1. Step 1 (Novell servers)
   1.1 Build the Server2IPXN index
   1.2 Build the IPXN to VLAN mapping and insert it into the Net2VN and Port2VN tables.
2. Step 2 (IP stations)
   2.1 Pass One (IP stations on server ports)
      2.1.1 Build the Net2Port index for the IPSNs.
      2.1.2 Build the Port2Net index, notifying servers and clients.
      2.1.3 For each assigned port:
         2.1.3.1 For each IPSN in Port2Net[port]:
            2.1.3.1.1 If already assigned, the IPSN may get another VLAN, announce the IPSN-IPXN contradiction and stop.
            2.1.3.1.2 Add the IPSN to the appropriate entry of the Net2VN table
   2.2 Pass Two (IPSNs of the server ports on the other ports)
      2.2.1 Activate the IP to VLAN mapping procedure for each already assigned port.
         2.2.1.1 If two IPSNs that have already been assigned different VLANs are detected on one port, put the port on Global (it can not be the server port)
   2.3 Pass Three (Remained IPSNs)
      2.3.1 Activate the IP to VLAN mapping procedure for all unassigned ports
3. Step 3 (Novell clients)
   3.1 Pass remained ports (client ports)
      3.1.1 If there are clients of different servers on the port
         3.1.1.1 If in the no-route case, put the port on Global
         3.1.1.2 Otherwise, find the optimal VLAN by the minimal hops principle
      3.1.2 If the server of the client has more than one IPXN, assign the VLAN according to the balance principle.
      3.1.3 Otherwise (normal case), assign the VLAN of the default server 3.8.3. Initialization in a mixed IP-Novell network The following procedure is implemented for the initialization phase in a mixed IP-Novell network.

1. Identify and poll the management agents for the LAN-Switch parameters thereby updating the VNS database
2. Acquire the IPSNs from the management platform's database
3. Store IPSNs in VNS database.
4. Identify the Novell servers/routers (see 3.7.1).
5. If Rule 1 or Rule 5 are not fulfilled, send an announcement to the user and stop.
6. For each Novell server Identify the stations that are logged into it (see 3.7.5.2).
7. For each MAC address acquired from the CAMs
   7.1 Look for the corresponding IP address in the management platform
   7.2 If not found, try to get the IP according to the MAC to IP address resolution procedure.
   7.3 If not found, assume that it is not the IP node
8. Activate the mixed Net to VLAN mapping procedure to build the Net2VN and Port2VN tables
9. Display the map to the user for confirmation or c change
10. If the user changed the map, edit the Port2VN table accordingly
11. Perform the VLAN assignment according to the Port2VN table 3.8.4. Change Management for mixed IP-Novell network Change management in a mixed IP-Novell network is simply a matter of uniting the change management procedures for the pure IP and pure Novell networks. Due to the "callback" nature of the change management, it is easy to unite these two procedures. The formal description of the procedure begins by listening for various kinds of changes. When a change is detected, it is processed as in the pure environments.

1. Listen for SAP and RIP broadcasts to detect server/router changes.
2. Listen for General RIP Requests to detect the station that lost its connection.
3. Listen for Get Nearest Server broadcasts to detect the stations that try to establish an initial connection with a server.
4. Listen for frequent ARP requests.
5. Listen for CAM change traps.

Definitions of some of the terms used in the above description are now provided:

Reserved ports—User-designated ports within a network to which the system shown and described herein does not assign VLANs.

Backbone ports list—list of all backbone ports within a network i.e. a list of all ports within a network which connect one switching hub to another, as opposed to ports which connect end-stations to switching hubs.

Net—an IP subnetwork (IPSN) or an internal packet exchange network (IPXN).

Net2VN map or Net2VN table—a table mapping a VLAN to each subnet in a network.

Port2VN table or Port2VN map—a table mapping a VLAN to each port in a network.

IPSN2VN table or IPSN2VN map—a table mapping a VLAN to each IPSN in a network.

IPXN2VN table or IPXN2VN map—a table mapping a VLAN to each IPXN in a network.

Global VLAN (or GN or global VN)—A VLAN that communicates directly with all VLANs defined for an individual network.

Appendix A is a set of computer listings which together form a preferred software implementation of a network layout detecting method constructed and operative in accordance with a preferred embodiment of the present invention.

A preferred method for generating a network layout identifying system using the computer listings of Appendix A is as follows:

a. Install the following commercially available equipment, as explained in the respective installation guides:

Madge hub or hubs with switch modules, such as an LET-36, LET-18E, LET-10 or LET-20, all commercially available from Madge Networks Ltd., Atidim Technological Park, Building 3, Tel Aviv 61131;

a Madge management module (agent card) for each hub, such as an NMA-II, NMA-E, NMA-RE, NMA-RS.

Madge management agent software, version 7.1 or higher;

a UNIX workstation with at least 64 MB of RAM and 1 GB of hard disk, plus a UNIX operating system, such as the Sparc, commercially available from Sun Microsystems, HP/UX, commercially available from Hewlett-Packard, or RS6000, commercially available from IBM;

ObjectStore database, marketed by Object Design, Inc., 25 Burlington Mall Road, Burlington, Mass. 01803, USA.

an HP OpenView or IBM NetView/6000 management platform; and

MultiMan/OV network management console software, version 3.1 at least, for Solaris, HPUX or AIX, for installation in the UNIX workstation.

b. Generate a digital file from each of the listings of Appendix A, by typing the source code of the listing on the workstation, using conventional text editors such as vi or emacs. Name each file as indicated at the top of each listing.

c. Compile the source code with the workstations native C++ compiler and link all modules together using the native linker.

d. Install the resulting executables, in accordance with the following installation instructions:

I. System Requirements

MultiMan/OV version 3.1 (for HP OpenView) Hardware and Software.

Virtual memory: 15 MB(in addition toMultiMan/OV requirements).

100 MB disk space for installation and discovery cache.

After installation make sure that there is at least 12 MB of free space in the /usr/mmov/Save/os-cache directory for use during discovery. If there is not enough space, make a symbolic link to another local directory.

Agents supported by Appendix A: NMA-RE, NMA-II, NMA-E, NMA, NMA-RS, SH-EMA. All agents must be version 7.1 or higher.

II. Before Installing the Software

1. Log in as root.
    2. If you are currently running OpenView exit to the Xterm window.
    3. Whether you have been using OpenView Windows or not, type in ovstop to halt all associated OpenView processes.
    4. Proceed to Software Installation Procedure.

III. Software Installation Procedure

1. Verify that the distribution tape is in the tape drive.
      (a) If your tape drive is attached to the machine on which you are installing the software, run the ovinstall command by typing the following:

/usr/OV/bin/ovinstall -p VNS-- -dtapedevice where tapedevice is st0 or st1.
      (b) If your tape drive is attached to a remote host, run the ovinstall command by typing the following:

/usr/OV/bin/ovinstall -p VNS -- -rhostname -dtapedevice where tapedevice is st0 or st1, and hostname is the name of the tape drive host.
    2. Restart HP Open View by typing the ovstart command.
    3. Start Open View Windows by typing ovw.

e. Run the software, using the following description to operate the software:

1. Introduction to VNS

This Section includes the following Sections:

Power of VLANs—Defines VLANs, and discusses the benefits of using VLANs in a network.

Difficulties of Large-Scale VLAN Implementation— Explains the difficulties of configuring and maintaining large networks with VLANs.

The VNS Solution—Discuses how VNS alleviates the difficulties with configuring and maintaining VLANs in large networks.

How VNS Assigns VLANs—Describes the principle VNS uses to assign VLANs.

Network Hardware Requirements—Describes the hardware requirements for VNS.

Power of VLANs

Until recently, only real topological networks existed. A topological network (for example, Ethernet) is called real when the devices reside on the same physical network segment. But in virtual topological networks, known as VLANs, the network devices may be located in diverse places around the network such as in different departments, on different floors or in different buildings. Each network device is connected to a hub, and the network manager uses software to assign each device to a virtual network. Elements can be combined into a Virtual LAN even if they are connected to different hubs.

Benefits of VLANs:

Broadcast Containment—Dividing the network into VLANs can be used to limit broadcast propagation to only the relevant ports. Otherwise broadcasts are delivered to all ports in the network, whether the ports need to receive them or not.

Security and Accountability—Sometimes it is undesirable to have uncontrolled access from every port to every other port. With VLANs, ports are unreachable except from authorized ports. This allows limiting the access to costly resources, increasing both security and accountability.

Matching Network Organization to Corporate Structure— Modern corporations, often work in teams of various sizes and compositions. VLANs allow each team to have its own LAN, regardless of the physical location of its members.

Difficulties of Large-Scale VLAN Implementation

VLAN Assignment

In order to use VLANs in a network, it is typically necessary to configure the entire network. Each port needs to be assigned to a specific VLAN. Typically, it is necessary to set each port separately, while keeping track of all Layer 3 over LANswitch ports. It is necessary to pay special attention to servers, routers, and client server connections, in order to configure an operational network properly. For example, it is desired to assign subnet 176.205.50.0 to VLAN 1, and subnet 176.205.60.0 to VLAN 2. If while configuring the network port by port, a port is found with both subnet 50 and 60. Then it is decided to assign the port to the global VLAN. However, it is then discovered that there is also a Novell server on the same port. This prevents the port from being assigned to the global VLAN. Thus it is necessary to redesign the VLAN assignments and begin the configuration again. To configure a network for VLANs optimally requires yet even more work. In a network that is optimally configured, there are a minimum number of stations that receive the broadcasts of other stations. And, in a Novell network, a minimum number of hops to routers. In order to manually determine which of the possible configurations has a minimum number of stations that receive the broadcasts of other stations, it is necessary to build a broadcast matrix for each possible configuration. In a network with many stations, building and comparing each of the many matrixes can be a very long and difficult process. In a Novell network, it is typically necessary to manually keep track of the router, client and server VLAN assignments in order to minimize the number of hops to routers. For example, assigning a client to a different VLAN than its server, and if there is a router that has been assigned one side to the same VLAN as the server and on the other side to the same VLAN as the client, the client and server will only be able to communicate through the router. Keeping track of all the various factors and manually assigning each port can be a tedious and confusing task, especially when working with a large network with many ports.

VLAN Maintenance

After the original network VLAN assignments have been implemented, the VLAN assignments must be updated for each and every physical and logical change in the network. Physical changes include a station being added to the network or being moved from one port to another. Logical changes include a station that remains connected to the same port but receives a new network address. In each case, the network manager must keep track of the previous configuration, which stations were added, moved or removed, from where and to where. Then the VLAN configuration must be updated accordingly, so that each station remains in the VLAN it was originally assigned to, and no stations loses connectivity.

The VNS Solution

VNS Assigns VLANs

VNS performs this task. First VNS learns the current network. It builds a mapping table between subnets and VLANs based on the information learned. VNS compares all of the more optimal network configurations and determines which configuration has the minimum number of stations receiving the broadcasts of other stations and the fewest hops to routers. VNS then proposes the optimal VLAN configuration. Preferably, the proposed configuration is accepted, or is altered to meet the specific needs. VNS implements the configuration, by assigning each port to the appropriate VLAN.

VNS Maintains VLANs

Typically, VNS "silently" monitors the network. It automatically detects and keeps track of all physical and logical network changes. VNS informs of all changes and suggests an optimal reconfiguration. Approving the suggested reconfiguration, VNS automatically implements the network changes.

How VNS Assigns VLANs

When VNS configures the network it strives for maximum correspondence between the logical Layer 3 network divisions and VLANs. Therefore, the general rule of VLAN assignment is that each logical subnet is assigned to a VLAN.

IP—In an IP network, all stations that belong to the same IP subnet are assigned to the same VLAN. Ideally only one IP subnet is assigned to each VLAN.

Novell Servers and Routers—Each IPX Net is assigned to its own VLAN.

Novell Clients—In a Novell network, each Novell server and the clients logged into the server are assigned to the same VLAN. If there are some clients on the same port that are attached to more than one server then VNS assigns the entire port to the VLAN of the dominant server. When VNS assigns VLANs it takes the existing configuration of the network into account. The existing configuration of the network may force VNS to assign the VLANs slightly differently than described above. VNS is used to optimize the network so that the VLANs is assigned ideally. For more information about optimizing the network refer to Recommended Network Setup in Section 2, and to Optimizing The Network in Section 6.

2. Recommended Network Setup

In order for VNS to optimally assign VLANs to the network, the network needs to be set up in a specific way. This Section discusses recommended network setups for various network types. This Section describes how to configure the network depending on the type of network currently in use.

IP Networks—Describes the recommended network setup for IP networks.

IPX Networks—Describes the recommended network setup for Novell networks.

Mixed Networks—Discusses the how to setup a network with both IP and IPX.

Networks with Other Protocols—Discusses how to deal with protocols besides IP and IPX in the network.

IP Networks

In general, a group of network devices that often communicate with each other are put together on a VLAN. For example, the members of the Finance department, plus the Finance server and printer, will all be together on one VLAN. For VNS to work optimally, each group of stations that work together should be on the same IP subnet. For example, the members of the Finance department, plus the Finance server and printer should be on the same IP subnet. If this is the case, then VNS will assign the whole group to one VLAN. There are two types of configurations that do not conform to the above rule:

The group of stations is split between several subnets.

There are more than one group of stations on a single subnet.

What if the Group of Stations is Split Between Several Subnets?

Figure 13:
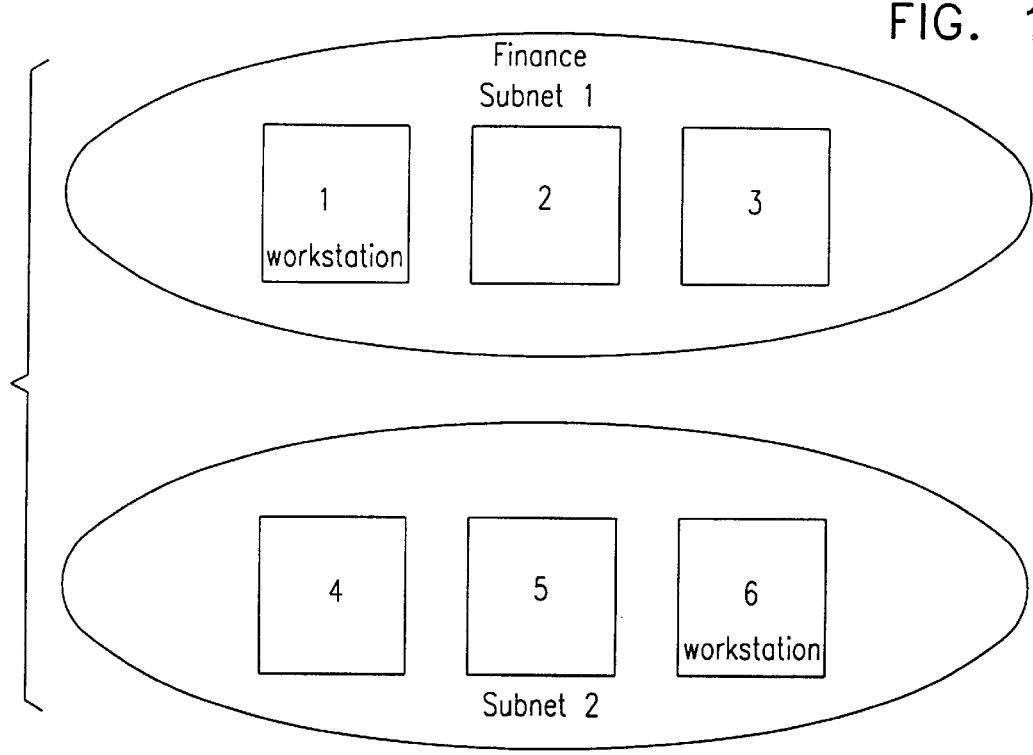
FIG. 13 is a simplified illustration of several workstations connected together on different subnets.

If stations that work together are on different subnets, it is typically required to move them before running VNS. For example, if all workstations in the Finance department are on subnet 1, except for workstation 6 which is on subnet 2, it is preferably required to reconfigure workstation 6 so that it is preferably on the Finance subnet typically with the workstation 1, workstation 2 and workstation 3, as illustrated in FIG. 13.

In order to reconfigure them, the VNS may include both subnets in one VLAN. For example, if all workstations in the Finance department are typically on subnet 1, except for workstation 6 which is on subnet 2, it is possible to have VNS make one VLAN that includes subnet 1 and subnet 2. Otherwise, workstation 6 is typically only able to communicate with the rest of the Finance department only via a router. It is necessary to inform VNS to do this after offering a recommended VLAN configuration for the network. For information about editing the VLAN configuration refer to Editing VLAN Recommendation in Section 3. Including both subnets in one VLAN solves the problem, but it is not an optimal solution. This is because workstations that are not in the same subnet may need to communicate through a router. Therefore it is suggested to reconfigure the network. What if there are More than One Group of Stations on a Single Subnet?

Figure 14:
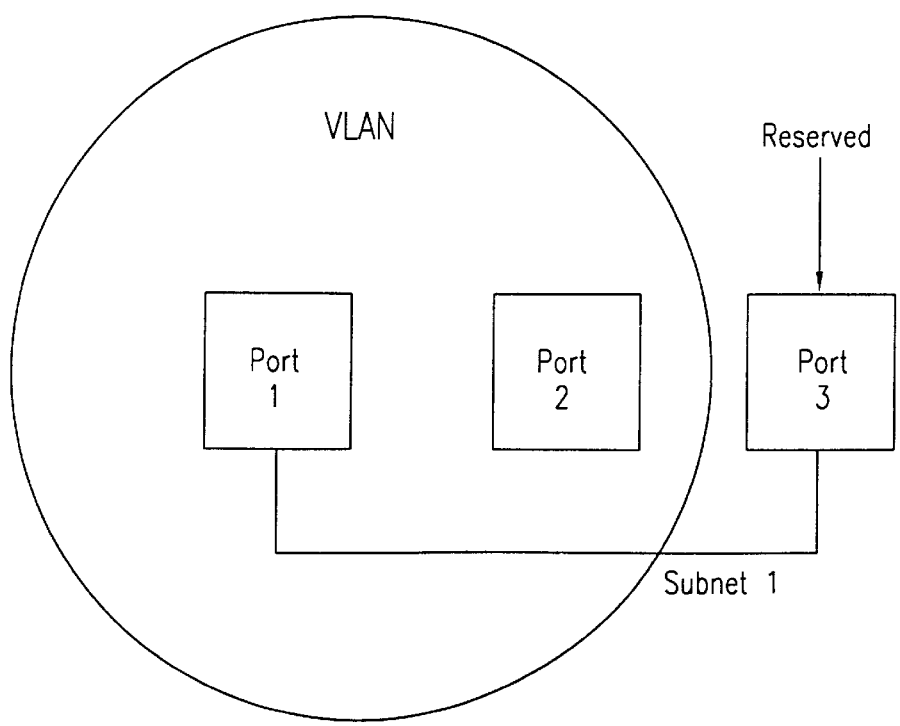
FIG. 14 is a simplified illustration of several workstations connected on the same subnet.

If two workstations are on the same subnet, the workstations are not assigned to separate VLANs. For example, if the subnet that typically includes the Finance department also includes a workstation from the Marketing department, it is preferably necessary to reconfigure the workstation from the Marketing department so that it is on a different subnet than the Finance department, as illustrated in FIG. 14. Note: To help VNS discover the network faster, it is recommended to open /usr/mmov/Save/vns.vip and enter the following information:
IP_broadcast_address:Netmask:Auxilary_IP_address
Where IP_broadcast_address and Netmask defines IP subnet. Auxilary_IP_address defines auxiliary IP address for each IP subnet, needed to perform efficient IP discovery. All classes (A, B and C) could be defined with all kinds of netmasks.

IPX Networks

Figure 15:
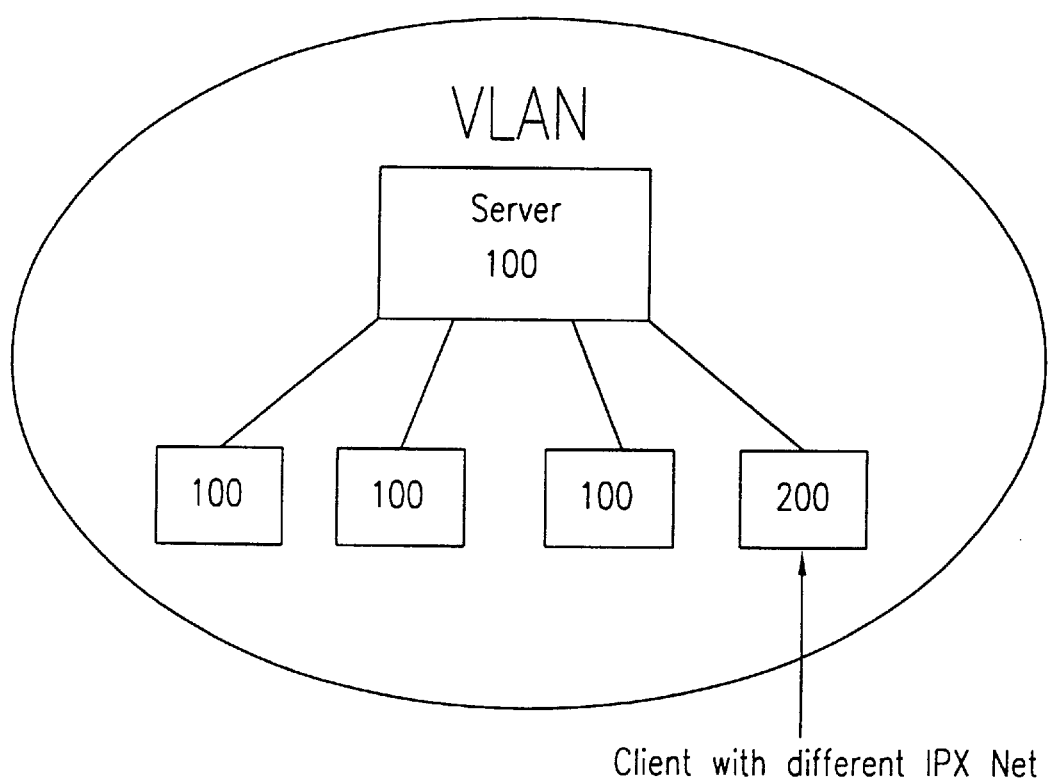
FIG. 15 is a simplified illustration of several Server stations connected on the same VLAN.

Each group of Server workstations that is necessary to define as one VLAN should be on the same IPX Net. Clients that typically want to be in the same VLAN can be in different IPX Nets, as long as they have the same server, as illustrated in FIG. 15. If the network is a flat non-switched network, VNS assigns all workstations to the same VLAN. VNS is useful if it is necessary to convert the network from a flat network on layer 3 to a routed network. Before running VNS, it is necessary to assign the servers and the routers different IPX nets.

Mixed Networks

In a network that has both IP and IPX stations, all IPX stations retain their previous VLAN assignments. If there are no existing VLAN assignments for IPX stations, VNS assigns all of the IPX stations to the same VLAN. The IP stations are assigned to VLANs according to their subnet.

Networks with Other Protocols

Ports using protocols not supported by VNS may be reserved in order to allow VNS to configure the rests of the ports in the network. For information about how to reserve ports refer to Reserving Ports in Section 3.

3. Assigning VLANs

This Section details the process of assigning VLANs to the network. Before beginning the assignment process, it is necessary to ensure that the network is set up properly. For information about setting up the network, refer to Recommended Network Setup in Section 2. This Section includes:

Starting VNS—When starting VNS it automatically learns the entire network, and displays a table with the current VLAN configuration (if any) and a recommended optimal VLAN configuration for the network.

Editing VLAN Recommendation—Accepting or editing the suggested configuration. Editing the configuration, VNS checks the legality of the configuration which is proposed, and warns of any problems.

Reserving Ports—Selecting particular ports that VNS should not configure.

Applying a VLAN Configuration To the Network—When a complete and legal configuration is ready and is confirmed, VNS automatically configures all of the ports with the VLANs.

Starting VNS

When starting VNS, it automatically learns the network and recommends an optimal VLAN configuration.
To start VNS from the NetView Main Window:
1. Open the Administrator menu and choose VNS.
To start VNS from the HP OpenView Window:
1. Open the Administrator menu and choose VNS.

Editing VLAN Recommendation

VNS uses specially developed algorithms to prepare an optimal configuration proposal. The proposal is displayed in the Main screen (refer to FIG. 16). It is necessary to edit the proposed configuration to meet the specific needs. Typically, also selecting specific ports that VNS is required to ignore during the configuration. For information about editing the VLAN configuration refer to Reserving Ports in this Section. A typical VNS Main Screen is illustrated in FIG. 16. Preferably, if stations that work together are on different subnets VNS may include both subnets in one VLAN. If two stations which are not to be together in the same VLAN are on the same subnet, VNS may reserve the port of one of the stations. For information about editing the VLAN configuration refer to Reserving Ports in Section 3.

To edit the recommended configuration:
1. In the Net To VLAN list, select the subnet or IPX net that is to be changed.
2. Type the changes in the Proposed VLAN field of the Main Screen.
3. Press Modify.

Reserving Ports

It is possible to reserve a port so that VNS will ignore it during VLAN configuration. The reserved port is not assigned to any VLAN. Reserving ports is useful if some of the ports in the network are using a protocol that VNS does not recognize. It is also possible to reserve the port of a station that VNS is to exclude from the VLAN configuration.

To reserve a port:
1. From the Configure menu, select Reserved Ports; the Reserved Ports screen appears.
2. In the List of LANSwitch Ports, select the ports to be reserved.
3. Press Add Reserved Port; the selected ports are displayed in the Reserved LANSwitch Ports list.

Applying a VLAN Configuration To The Network

Editing the recommended VLAN configuration, VNS checks the legality of the configuration before it configures the network.

To submit a configuration to be checked for legality:
1. Press Apply.

VNS checks the legality of the edited configuration and displays any appropriate warnings and error messages. For information about the various warnings and messages refer to Message Log in Section 8.

After solving the problems with the VLAN configuration (if any), Press Apply; VNS checks the legality of the configuration again. If the proposed configuration is legal, VNS implements the configuration VNS sends information in the message log as it configures each port.

4. Maintaining VLANs

After VNS has successfully configured the network with VLANs, VNS automatically enters the Maintaining VLANs mode. VNS automatically detects and keeps track of all physical and logical changes to the network. VNS displays a message describing each detected network change in the message log. VNS has two maintenance modes:

Automatic Maintenance Mode—VNS automatically detects all network changes and reconfigures the VLANs in the network for the new configuration.

Figure 17:
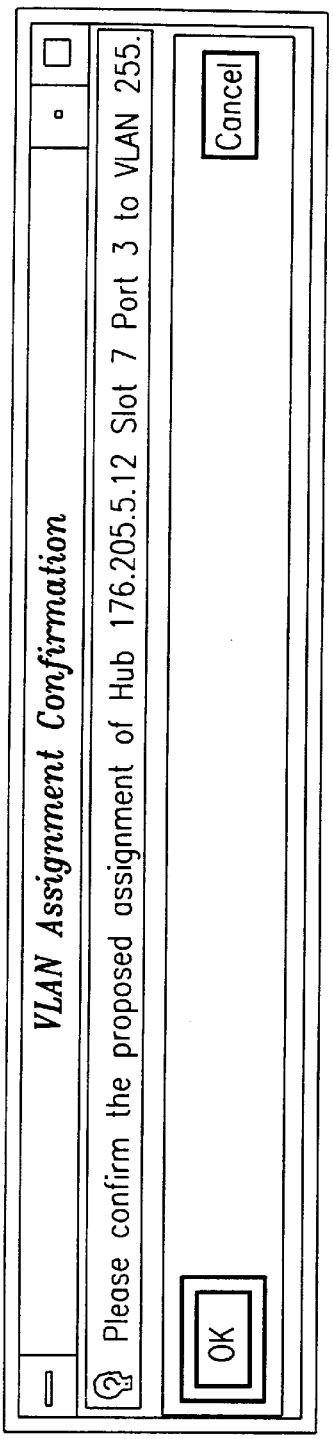
FIG. 17 is an illustration of a typical VLAN Assignment Confirmation Screen.

Confirmed Maintenance Mode—VNS displays a pop-up window to send information of any network change. VNS then suggests an optimal VLAN reconfiguration. On giving approval of the suggested reconfiguration, VNS automatically implements the VLAN changes. A typical VLAN Assignment Confirmation Screen is illustrated in FIG. 17.

To accept the VNS reconfiguration suggestion:
1. Press OK; VNS reconfigures the network.

To reject the VNS reconfiguration suggestion:
1. Press Cancel; VNS makes no changes to the current network configuration.

Note: On rejecting the VNS reconfiguration suggestion, network devices that were added or moved may not be assigned to the correct VLAN.

5. Documenting Network Development

Using the VNS reports to document the network may be performed in various ways. Typically, reviewing the current network configuration at any time, and allows archiving the reports to keep track of network changes over time. VNS reports may also be used to trace a station that has been moved. This Section describes specific examples of ways of using VNS reports to document the development of the network.

Viewing Current Network Configuration—Explains how to use VNS reports to view the network's current configuration.

Recording Network Activity—Describes how to use VNS to maintain a cumulative history of network configuration activity.

Tracing a Station that was Moved—Explains how to use VNS generated reports to trace a station that has been moved.

Viewing Current Network Configuration

Using VNS reports to view the current configuration of the network.

Ports to Network Report

The Ports to Network Report lists all of the ports in the network, and the IP Subnet/IPX Net and VLAN assignment of each port.

Figure 18:
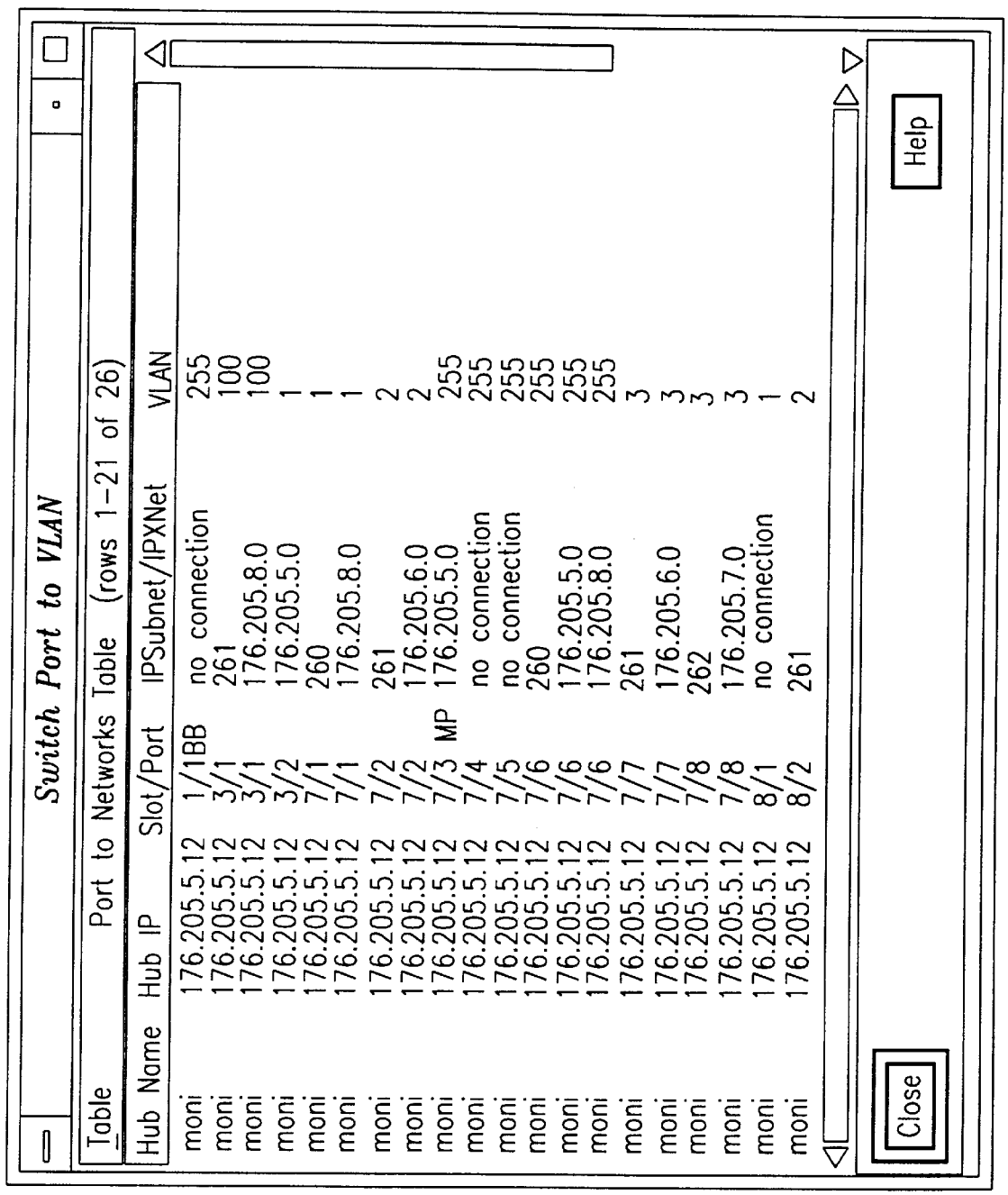
FIG. 18 is an illustration of a typical Switch Port to VLAN Screen.

To view the Ports to Network report:
1. From the Reports menu, select Port; the Switch Port to VLAN screen appears. A typical Switch Port to VLAN Screen is illustrated in FIG. 18.

Station to Network Report

The Station to Network report lists the stations in the network, their names, hub name, slot and port number, type, network address, and VLAN assignment.

To view the Station to Network report:
1. From the Reports menu, select Station; the Station Port to VLAN screen appears. A typical Station Port to VLAN Screen is illustrated in FIG. 19.

Novell Server to Client Report

The Novell Server to Client report lists the clients in the network, their IPX Net and server name.

To view the Novell Server to Client report:
1. From the Reports menu, select Novell; the Novell Client to File Server Attachment screen appears. A typical Novell Client to File Server Attachment Screen is illustrated in FIG. 20.

Recording Network Activity

Typically using VNS messages to maintain a cumulative history of the following network configuration activities:

Station moves and changes.

Misconfigurations

Connectivity problems

For more information about the VNS messages refer to Message Log in Section 8.

Tracing a Station that Moved

It is possible to use the information that VNS provides to the platform application to trace a station that changed location. For example, workstation 6 was moved three times and it is required to know the previous positions of workstation 6.

To trace a station that was moved:
1. In the platform application, open the Alert Events log.
2. From the View menu, select Set Filters.
3. Match the message string and the name of the station necessary to trace.

6. Optimizing the Network

In order to use VNS to create an optimal configuration for the network. VNS defines an optimal network as a network with the minimum number of ports assigned to more than one subnet. If the network is configured optimally, it can be assigned the most logical VLAN configuration. To create an optimal configuration:

1. Start VNS. For more information about starting VNS refer to Starting VNS in Section 3.
2. In the Net to VLAN field of the Main screen, determine if VNS assigned more than one subnet to the same VLAN. If there are no subnets mapped to the same VLAN then the network is already configured optimally.
3. Edit the configuration suggestion, so that each subnet or IPX net is assigned to a different VLAN. Press Apply. For example, if VNS suggests the configuration displayed in FIG. 21, edit the configuration to the one displayed in FIG. 22. FIG. 21 illustrates a typical VLAN configuration suggestion in which more than one subnet is assigned to the same VLAN, and FIG. 22 illustrates a VLAN configuration suggestion that has been edited to assign each subnet to a different VLAN. For more information about editing the VNS configuration suggestion refer to Editing VLAN Recommendation in Section 3.
4. VNS displays messages that explain why the various subnets cannot be placed in the same VLAN. It is possible to use these messages to determine what network changes need to be made in order to optimize the network. For example, the message displayed may say: "The application assigned Hub NMA RE 149.49.150.56 Slot 11 Port 1 to the Global VLAN because of multiple IP Subnets on the port". This indicates that in order to optimize the network only one of the IP subnets can remain on the port. For a list of messages and information on what to do for each message, refer to Applying a VLAN Configuration To The Network in Section 3.

5. Use the Ports to Network Report to determine which network address are attached to the port.
6. If it is possible, physically move the problematic stations from the current port to a port with only the same IP Subnet as the problematic stations.
7. To see if the network changes were successful, on the VNS Main screen press Apply. If the network is still not optimally configured VNS will again display messages. Continue from step 4.

7. Troubleshooting the Network

It is possible to use VNS reports together with other network management applications to detect, locate, and fix various types of network problems.

Example

Workstation 6 from the Marketing department sends a message that the workstation cannot access its files.

1. Use the VNS Novell Server to Client report to determine which servers are connected to workstation 6. In the VNS main screen, from the Report menu select Novell. Determine that workstation 6 is connected to two servers, the Marketing server and the Finance server.
2. Use TerrainMaster to find the path between workstation 6 and the Marketing and Finance servers, and troubleshoot the network path. For more information refer to the TerrainMaster User's Guide.
3. If the network path is not the problem it is preferable to use the VNS Station to Network report to check if workstation 6 has the same IPX net as its servers but is assigned to a different VLAN. In the VNS main screen, from the Report menu select Stations. If a workstation is assigned to a different VLAN than a server with the same IPX net, the workstation and server will not have connectivity.

8. Reference

This Section contains an overview of each VNS screen:
VNS Main Screen
Message Log
Reserved Ports
Backbone Ports
Input / Output Ports
Ports to Network Report
Station to Network Report
Novell Server to Client Report
Print
Sort
Configure

VNS Main Screen

This screen displays the current network configuration and the VNS suggested configuration. A typical VNS Main Screen is illustrated in FIG. 23. Use this screen to edit and apply network configurations.
Notes
Press a column heading to sort the Net To VLAN Mapping list based on that heading. For example, to sort the Net To VLAN Mapping list by net addresses, press the Net Address heading.

Items in the list that have been edited are displayed in red.
Press Undo to undo editing to the current and proposed network to VLAN map.
Press Refresh to recalculate the current and proposed network to VLAN map.
For information about editing proposed network configurations refer to Editing VLAN Recommendation in Section 3.
For information about applying VLAN configurations to the network refer to Applying a VLAN Configuration To The Network in Section 3.
To access the VNS Main Screen
The VNS Main Screen opens automatically when opening VNS.

Message Log

Figure 24:
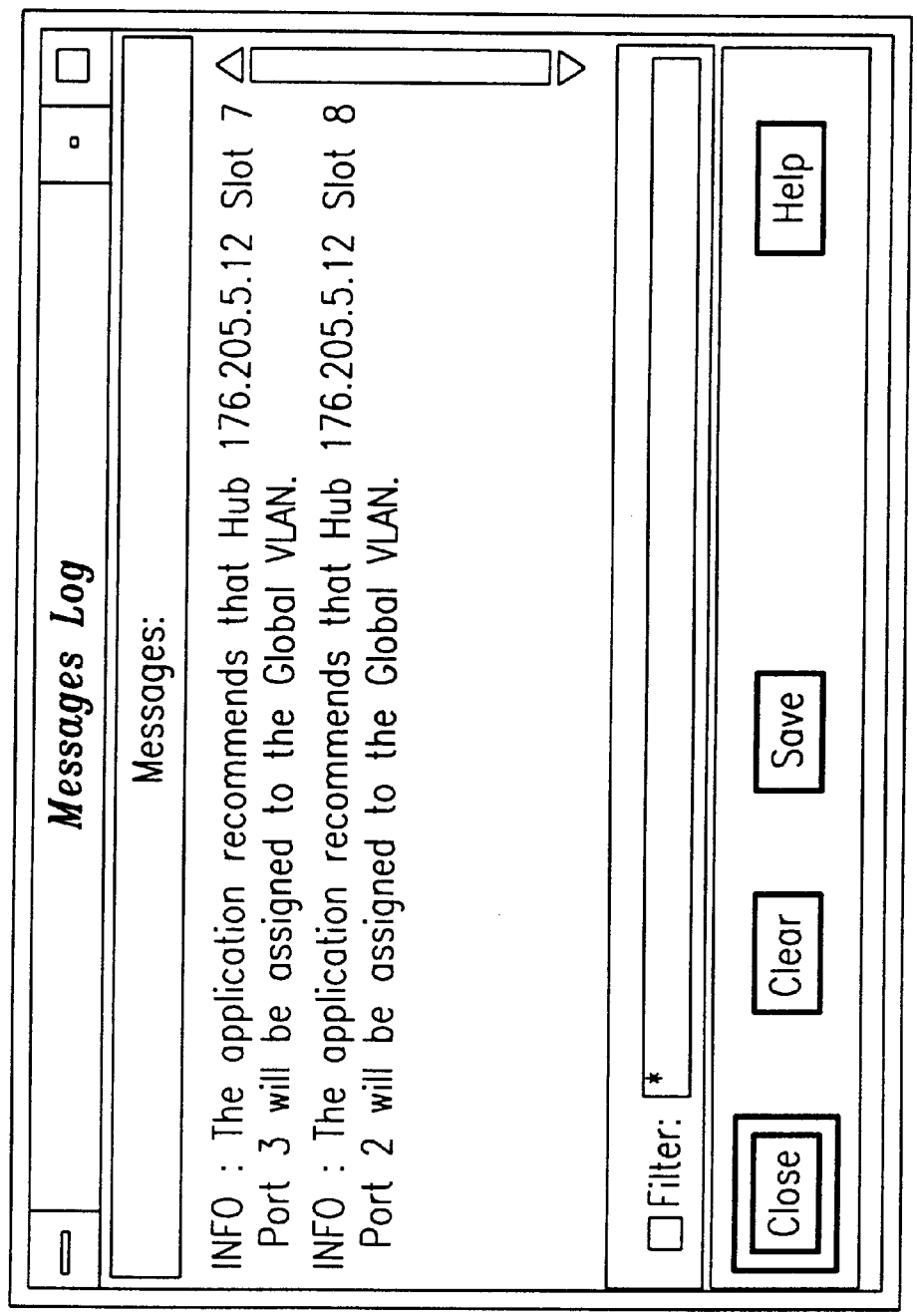
FIG. 24 is an illustration of a typical Message Log Screen.

This screen displays each step as VNS implements the configuration. A typical Message Log Screen is illustrated in FIG. 24. The screen also displays warning messages and message severity.
Notes
To save the messages, press Save.
To access the Message Log Screen
The Message Log screen opens automatically if VNS finds errors with the proposed VLAN configuration.
Messages

TABLE 1

VNS messages and suggested solutions

| Message | How to correct problem |
| --- | --- |
| Hub X Slot X Port X is assigned to the Global VLAN. | — |
| The application recommends that Hub X Slot X Port X is to be assigned to the Global VLAN. | — |
| The application assigns Hub X Slot X Port X to the Global VLAN because of Novell client connection problem. | Use the Novell Server to Client report to check the port. For information about the Novell Server to Client report refer to Novell Server to Client Report in Section 5. |
| The application assigns Hub X Slot X Port X to the Global VLAN because of multiple IP Subnets on the port. | Use the Ports to Network report to check the port, and reconfigure the stations if necessary. For information about the Ports to Network report refer to Ports to Network Report in Section 5. |
| The application detects that Network X appears on VLAN X (Hub X slot X port X) and on VLAN X (Hub X slot X port X). | Use the VNS reports to check the ports and reconfigure the stations if necessary. For information about the VNS reports refer to Viewing Current Network Configuration in Section 5. |
| The application identifies a NetWare client on Hub X Slot X Port X that cannot reach its server connect, but the port cannot be changed to Global because of Novell Server or Router connected to it. | Use the Ports to Network and the Novell Server to Client reports find the problematic port. Reconfigure the port if necessary. For information about the VNS reports refer to Viewing Current Network Configuration in Section 5. |
| The application indicates that Hub X Slot X Port X is to be assigned to the Global VLAN, but the port cannot be changed to Global because of Novell Server or Router connected to it. | Reconnect the server, router or one of the stations to an different port. |
| The application detects a conflict between Ports. Hub X Slot X Port X serves Networks X and Hub X Slot X Port X serves Networks X. | There is a misconfiguration. Reconnect the problem port to resolve the conflict. |

TABLE 1-continued

VNS messages and suggested solutions

| Message | How to correct problem |
| --- | --- |
| The application successfully assigns Hub X Slot X Port X to VLAN X. | — |
| The application fails to assign Hub X Slot X Port X to VLAN X. | Press Apply to retry the VLAN assignment. If that doesn't work then check the module |
| Hub X Slot X: The application is unable to configure Hub X Slot X because the module is in Manual mode. | Use the module dip switches to configure the module in Auto mode. |
| The application detects two IPX interfaces with different IPX networks on Hub X Slot X Port X. | Use the Ports to Network report to find the interfaces and move one of the interfaces to a different port. For information about the Ports to Network report refer to Ports to Network Report in Section 5. |
| CHANGE: The application detects a change on Hub X Slot X Port X from IP subnet X IP address X to IP subnet X IP address X. | — |
| The application detects a NetWare client initial connection problem with station X on Hub X Slot X Port X. | VNS automatically corrects this problem. |
| CHANGE: The application detects a new station X on Hub X Slot X Port X. | — |
| CHANGE: The application detects that station X moved from Hub X Slot X Port X. | — |
| CHANGE: The application detects that station X moved from Hub X Slot X Port X to Hub X Slot X Port X. | — |
| The application successfully assigns VLANs for entire network. | — |
| The application fails to assign VLANS for entire network. | Press Apply to retry the VLAN assignment. |
| The application fails to learn the network. | Contact Madge technical support. |
| The application fails to calculate current mapping. | Contact Madge technical support. |
| The application failed to calculate optimal mapping. | Contact Madge technical support. |
| Application internal error: file X line X | Contact Madge technical support. |
| VLAN for Network X is missing. | Press Refresh to recalculate the proposed and current Net to VLAN mapping. |
| CHANGE: Missing VLAN for Network X in hub X slot X port X. | Press Refresh to recalculate the proposed and current Net to VLAN mapping. |
| Application port should be Global VLAN. Currently VLAN X. | Connect the station running VNS to a global port, or assign the port that VNS is currently on to the global VLAN. |
| Network X is not connected to any port. | — |
| The application detects, that NetWare client X on Hub X Slot X Port X lost connection to server X. | VNS automatically corrects this problem. |

Reserved Ports

This screen is used to reserve a port so that VNS will ignore it during VLAN configuration. A typical Reserved Ports Screen is illustrated in FIG. 25.

Notes

To remove a port from the Reserved LANSwitch Ports list, select the port which is to be deleted and press Delete Reserved Port.

To see how to reserve ports refer to Reserving Ports in Section 3.

For information about why to reserve ports refer to Recommended Network Setup in Section 2.

To access the Reserved Ports Screen

From the Configure menu, select Reserved Ports.

Backbone Ports

Figure 26:
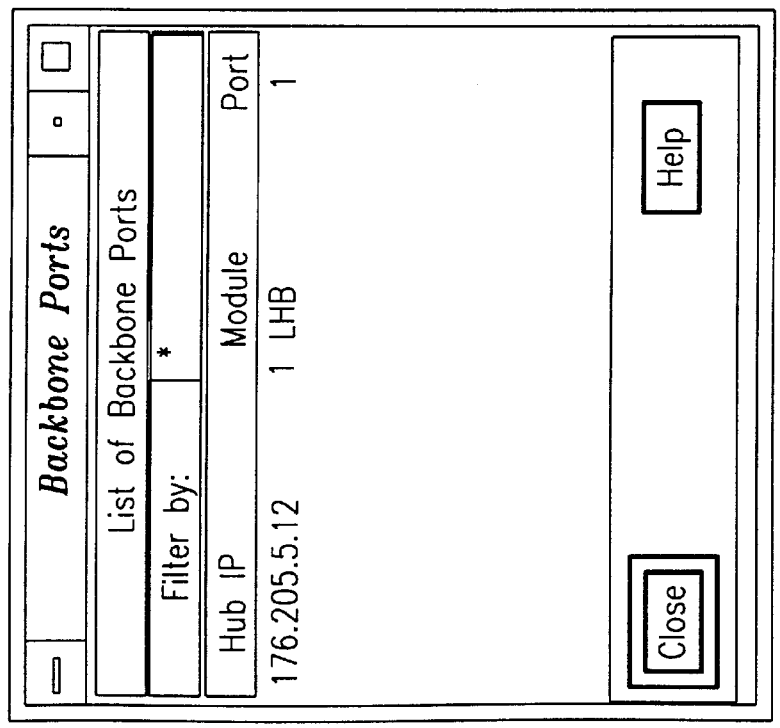
FIG. 26 is an illustration of a typical Backbone Ports Screen.

Use this screen to view a list of Backbone Ports in the network. A typical Backbone Ports Screen is illustrated in FIG. 26.

Notes

Use the Filter by field to determine which ports will be displayed

To access the Backbone Ports Screen

From the Configure menu, select Backbone Ports.

Input/Output Ports

Figure 27:
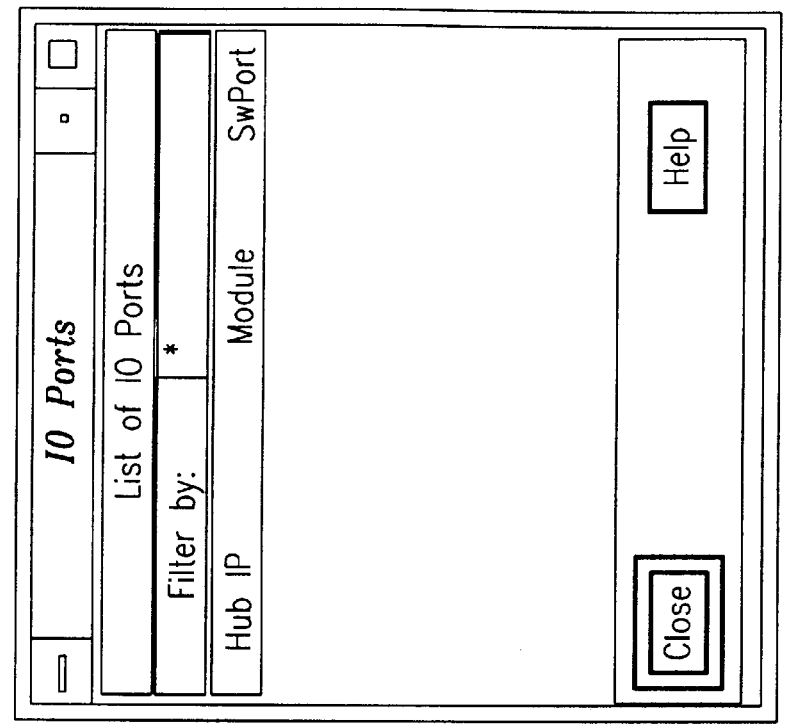
FIG. 27 is an illustration of a typical Ports Screen.

Use this screen to view a list of IO Ports in the network. A typical IO Ports Screen is illustrated in FIG. 27.

Notes

Use the Filter by field to determine which ports will be displayed

To access the Backbone Ports Screen

From the Configure menu, select IO Ports.

Ports to Network Report

Use the Ports to Network report to view list of all ports in the network, and the IP Subnet/IPX Net and VLAN assignment of each port. A typical Switch Port to VLAN screen is illustrated in FIG. 28.

Notes

For more information about using the Ports to Network report refer to Documenting Network Development in Section 5.

Information about printing, sorting and configuring the report can be found later in this Section.

To access the Ports to Network Screen

From the Reports menu, select Port.

Station to Network Report

Use the Station to Network report to view a list of the stations in the network, their MAC address, hub name slot and port number, type, network address, and VLAN assignment. A typical Station to Network screen is illustrated in FIG. 29.

Notes

For more information about using the Station to Network report refer to Documenting Network Development in Section 5.

Information about printing, sorting and configuring the report can be found later in this Section.

To access the Station to Network Screen

From the Reports menu, select Station.

Novell Server to Client Report

Use the Novell Server to Client report to view a list of the clients in the network, their IPX Net and server name. A typical Novell Server to Client screen is illustrated in FIG. 30.

Notes

For more information about using the Novell Server to Client report refer to Documenting Network Development in Section 5.

Information about printing, sorting and configuring the report can be found later in this Section.

To access the Novell Server to Client Screen
From the Reports menu, select Novell.

Print

Figure 31:
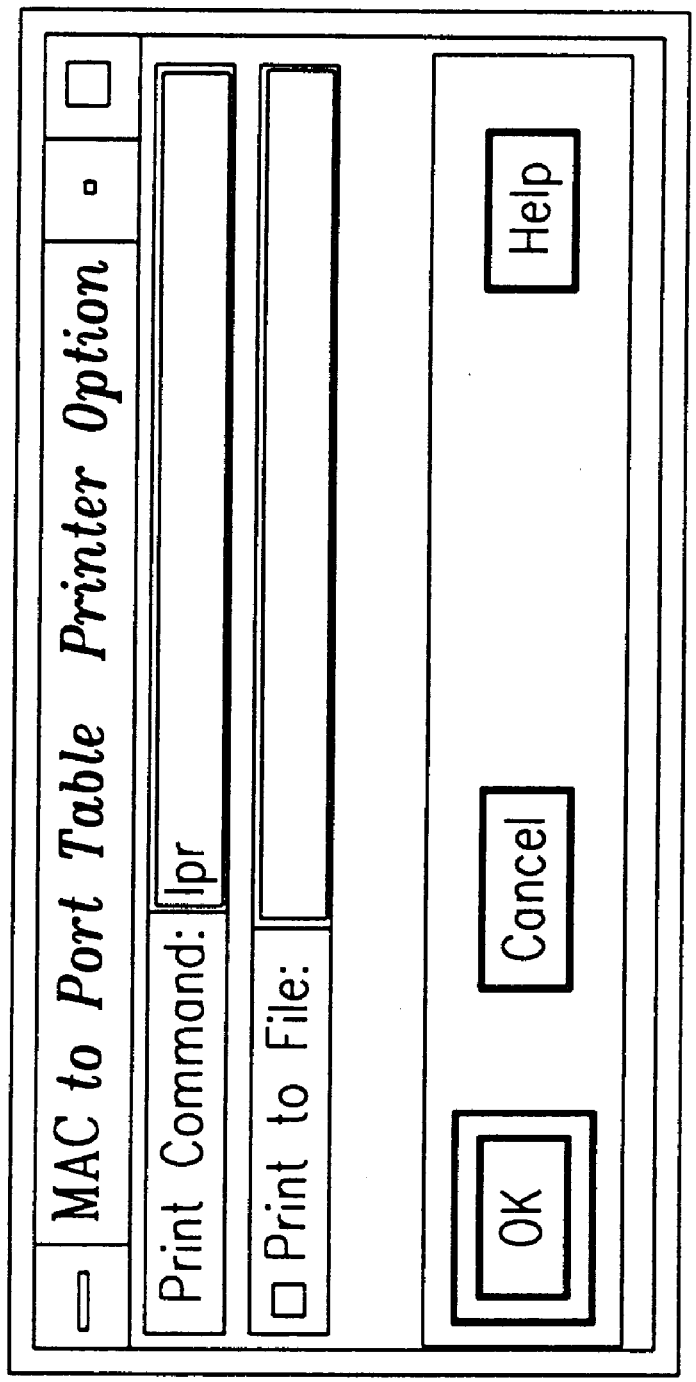
FIG. 31 is an illustration of a typical Print Screen.

Use the Print screen to print a report. A typical Print screen is illustrated in FIG. 31.
Notes
To print to a file, select Print to File.
To access the Pint Screen
From the Table menu, select Print.

Sort

Figure 32:
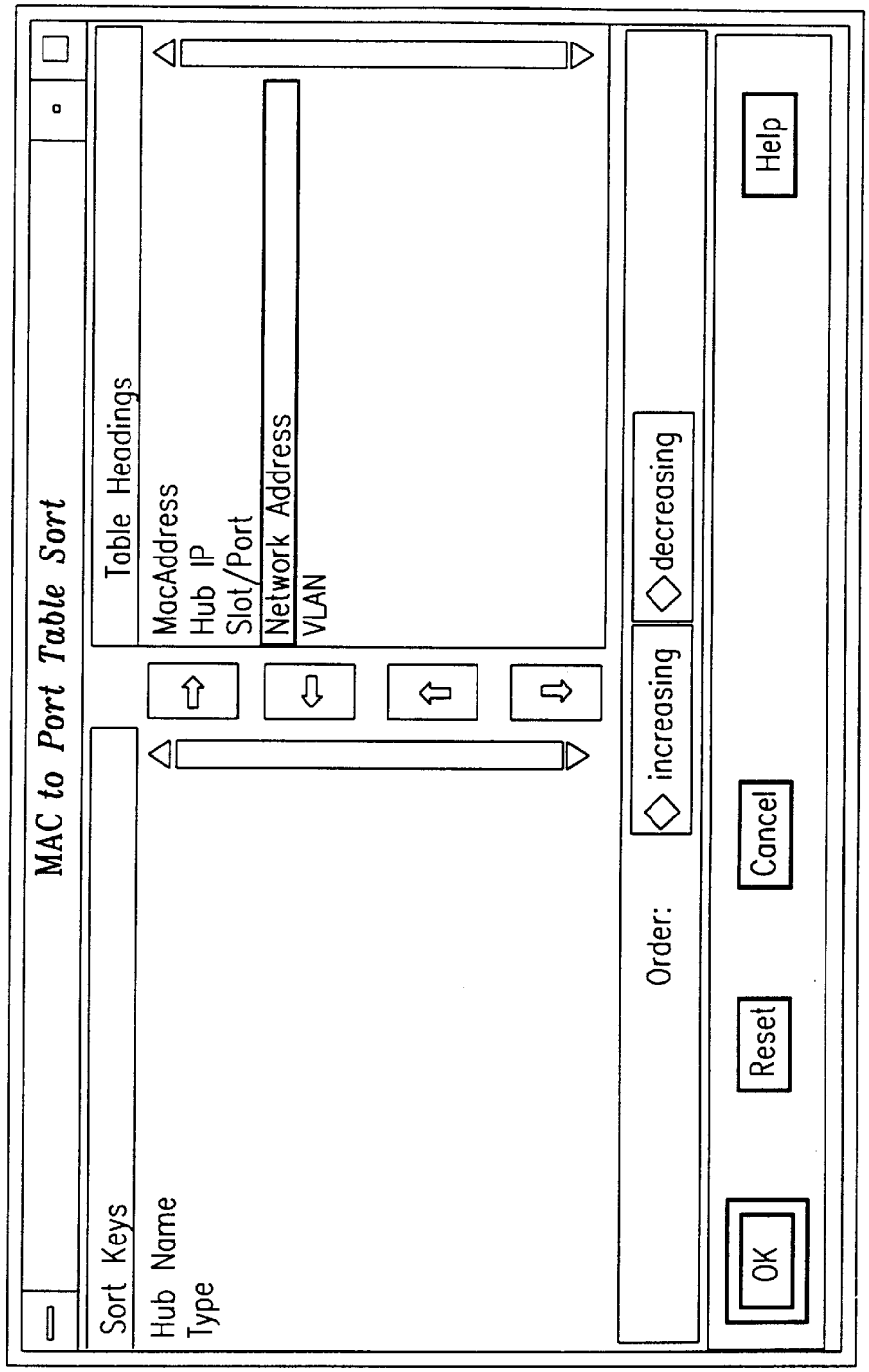
FIG. 32 is an illustration of a typical Sort Screen.

Use the Sort screen to control the order that items in a report are displayed. A typical Sort screen is illustrated in FIG. 32.
Notes
To choose headings to sort by, select the heading in the Table Headings list and press the left arrow button.
To remove a heading from the Sort Keys list, select the heading and press the right arrow button.
To display the report in increasing order, select Increasing.
To display the report in decreasing order, select Decreasing.
To return to the original settings, press Reset.
To access the Sort Screen
From the Table menu, select Print.

Configure

Figure 33:
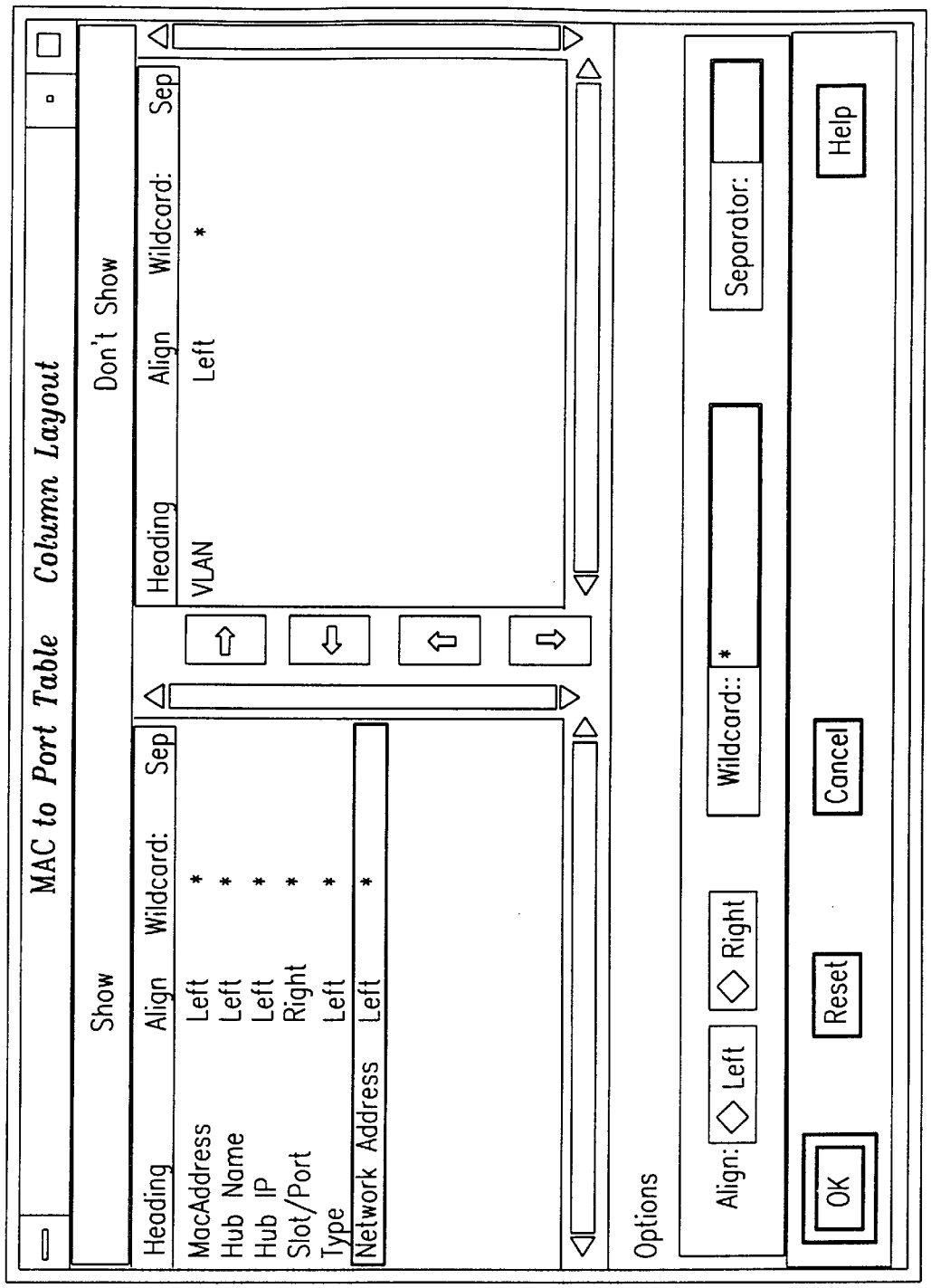
FIG. 33 is an illustration of a typical Configure Screen.

Use the Configure screen to control how a report is displayed. A typical Configure screen is illustrated in FIG. 33.
Notes
Headings that appear in the Show list are displayed in the report. Headings that appear in the "Don't Show" list are not displayed in the report. To move a heading to one of the lists, select the heading and press the left or right arrow button to move the heading to the appropriate list.
To change the order that the headings are displayed, select a heading and press the up or down arrow button.
Use the Align buttons to set whether the headings will be displayed on the left or right side of the columns.
Use the Wildcard field to set which items will be displayed in the report.
Use the Separator field to set what character separates between the columns of the report.
To return to the original settings, press Reset.
To access the Configure Screen
From the Table menu, select Configure.

FIG. 34 is a screen generated by a VLAN assigning system, such as the software embodiment of Appendix A, for a network including 4 IP subnets and 3 IPX networks. The display of FIG. 34 includes, for each IP subnet or IPX network, its network address, a previous VLAN to which the subnet or network was assigned according to a previous VLAN assignment scheme, and a proposed VLAN to which the subnet or network is assigned according to the VLAN assignment scheme generated by the software embodiment of Appendix A.

Figure 35:
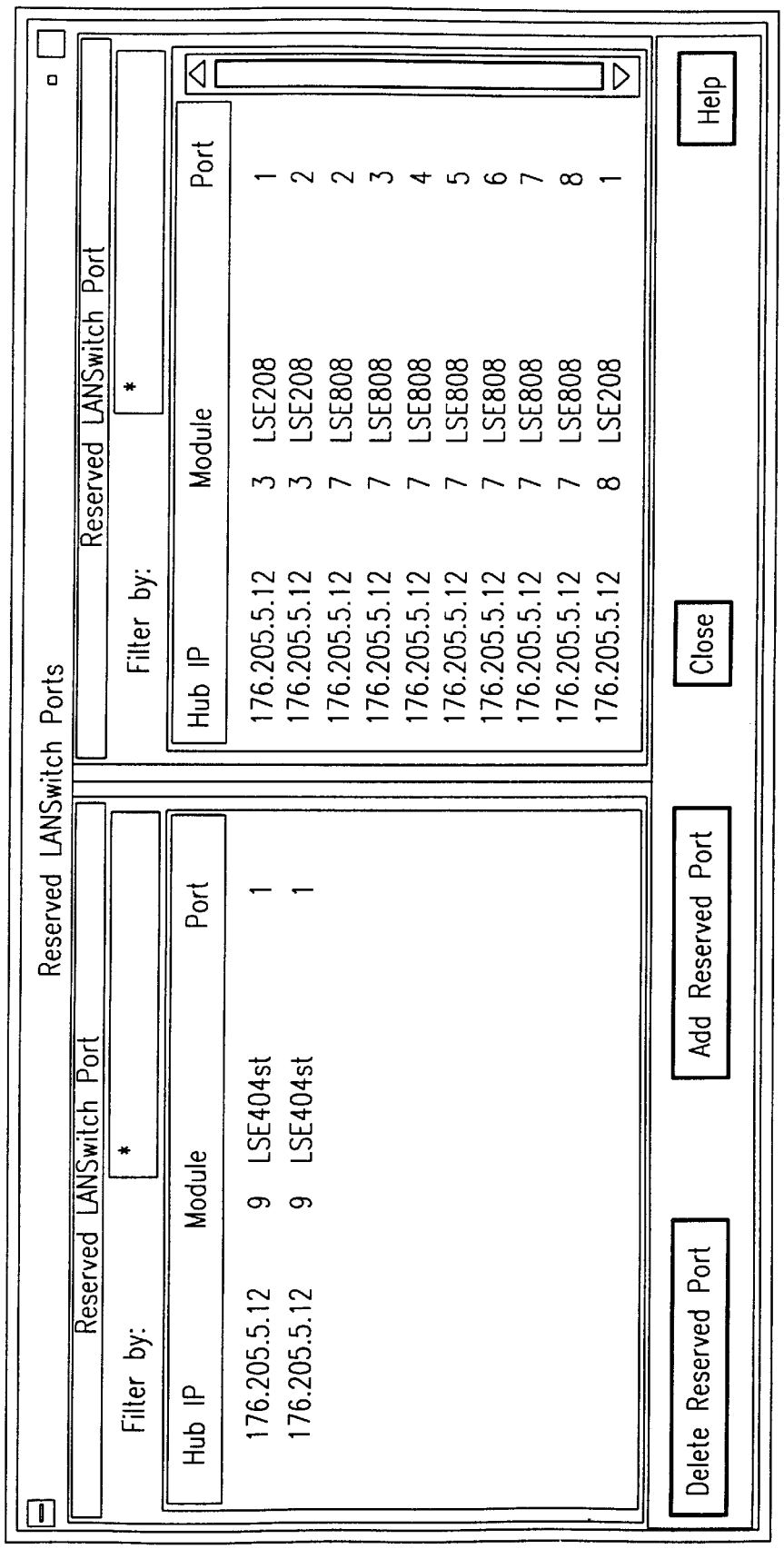
FIG. 35 is a pictorial illustration of a screen generated by a VLAN assigning system which prompts a user to define reserved ports to which no VLAN is to be assigned.

Reference is now made to FIG. 35 which is a screen generated by a VLAN assigning system which prompts a user to define reserved ports to which no VLAN is to be assigned. Once the user has assigned one or more reserved ports, the system generates a VLAN assignment scheme according to which only components of the network other than the reserved ports are assigned to VLANs. The system typically operates as it would if reserved ports had not been assigned, i.e. the system operates as it normally would for a network in which the reserved ports are absent.

According to a preferred embodiment of the present invention, apparatus for managing a switched routed network is provided which includes:

a. a network configuration learning unit operative to learn a configuration of a switched routed network including an existing division into VLANs. The network configuration learning unit comprises a diagnostic unit for analyzing and diagnosing the existing division of the network into VLANs.

b. a VLAN assignment unit for generating a new division of the network into virtual LANs (VLANs) based on the learned configuration of the network.

Figure 36:
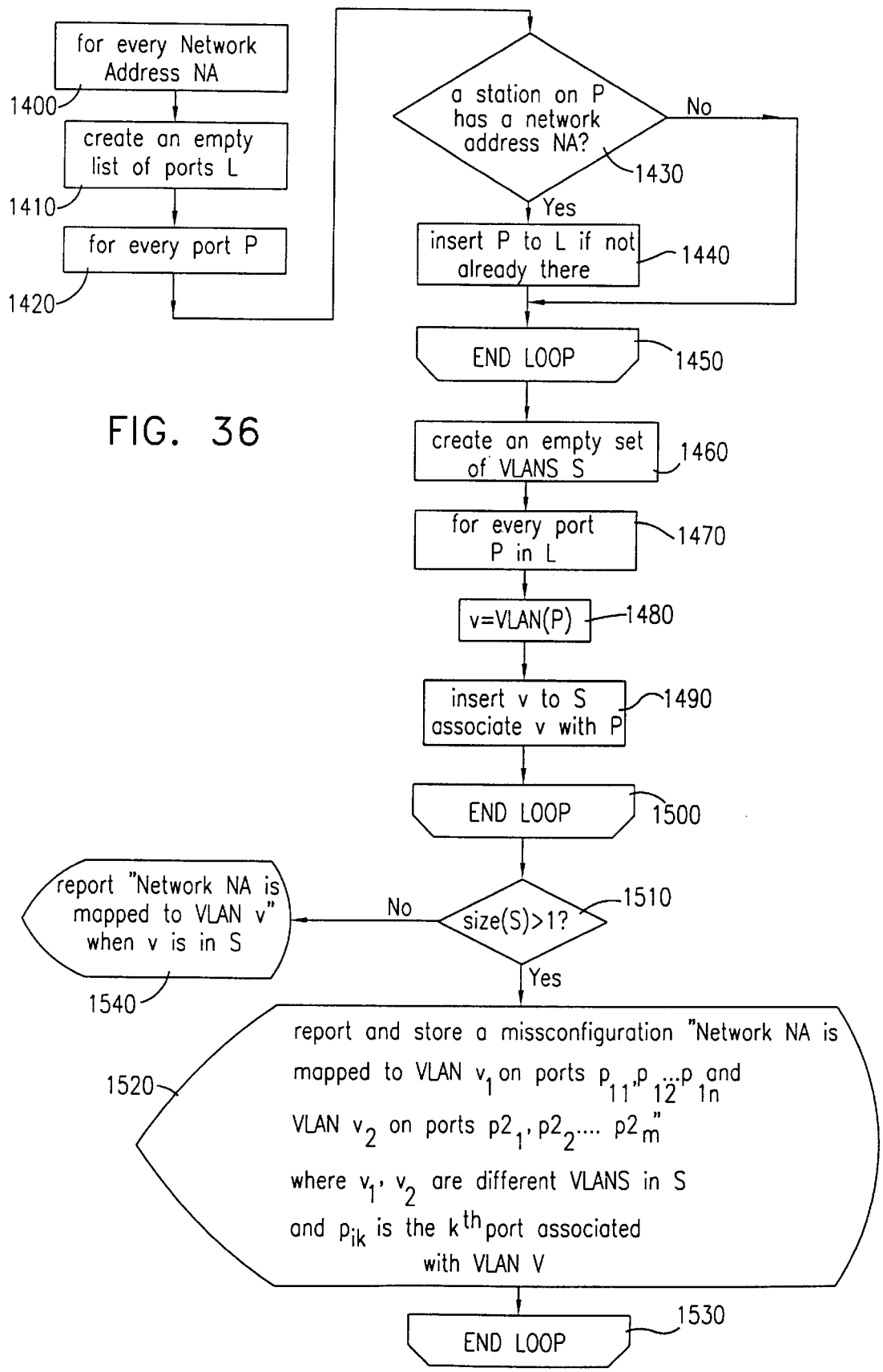
FIG. 36 is a simplified flowchart illustration of a preferred method of operation for VLAN assignment apparatus constructed according to a preferred embodiment of the present invention and operative to identify contradictions in an existing VLAN assignment.

FIG. 36 is a preferred method of operation for VLAN assignment apparatus constructed according to the above-referenced embodiment. The method of FIG. 36 identifies the subnets into which the network is divided by analyzing each network address detected in the network. For each such subnet, the method determines the VLAN or VLANs associated therewith in the existing division of the network. The method is also operative to find, for each VLAN identified, all ports associated with that VLAN. Unless only one VLAN is found, the method is operative to identify contradictions in the information it finds. For example, if a single subnet is found to be associated with more than one non-global VLAN, this is a contradiction. Another example of a contradiction is a Novell server which belong to different IPX networks and are found to be connected to ports assigned to a single VLAN. Yet another example of a contradiction is an IPX router belonging to different IPX networks which are found to be connected to ports assigned to a single VLAN.

Referring again to FIG. 3, the method shown and described herein is preferably operative to perform a change management function by detecting at least one event at an individual network element including detecting the identity of the individual end-station. Events comprise any of the following:

a. A logical change such as a change in the IP address of an end-station.

b. A physical change. Examples of physical changes include adding a new end-station and moving an end-station from port to port.

c. A communication failure. Examples of communication failures include a failed attempt of a NetWare client end-station to initially connect to a server end-station, and disconnection of a NetWare client end-station from a server end-station.

Figure 37:
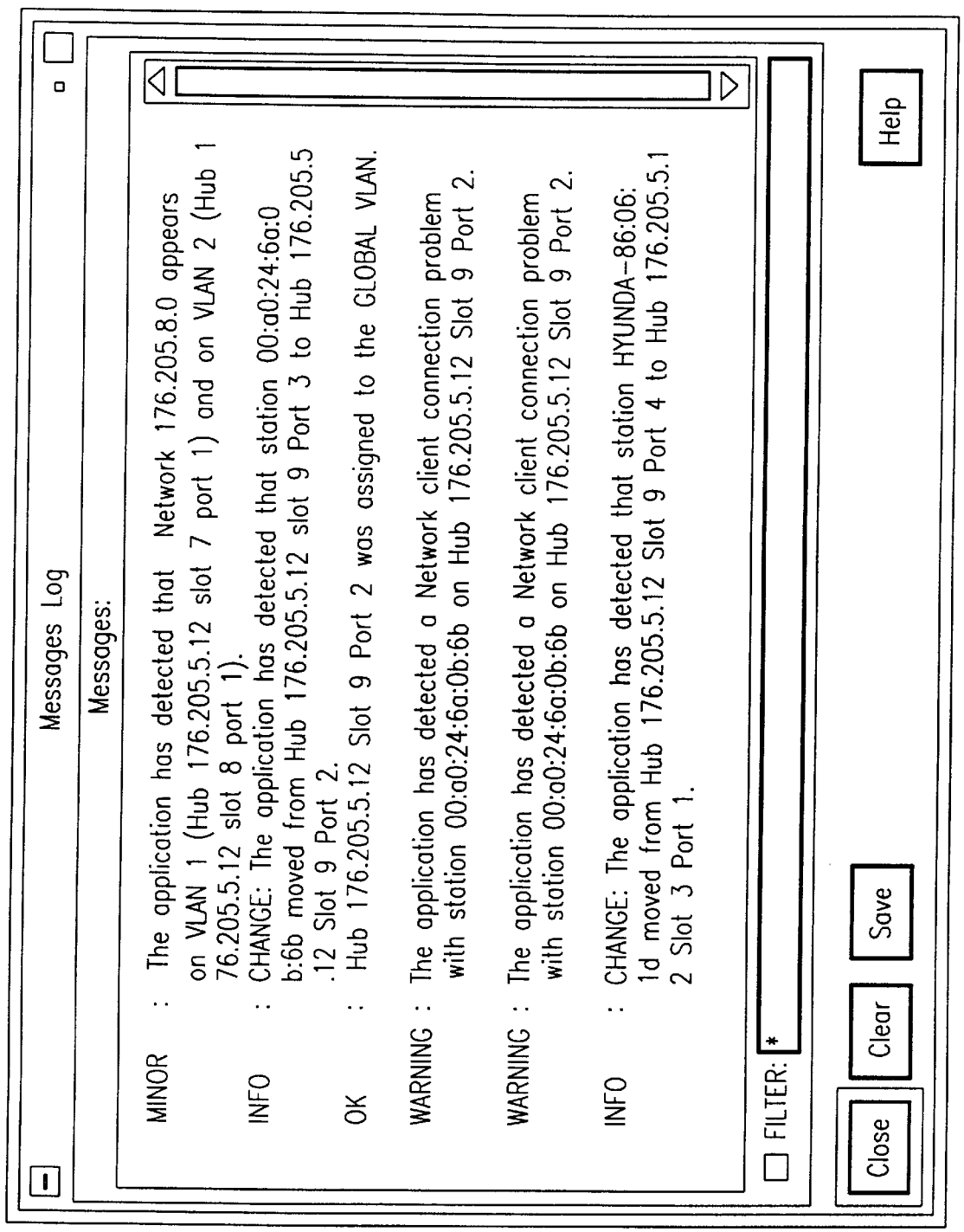
FIG. 37 is a pictorial illustration of a screen which includes a warning regarding a problematic event and an indication of a non-problematic event.

Each event is preferably categorized as either problematic or non-problematic. If the event is problematic, a suitable warning is generated such as the warning on the screen display of FIG. 37. If the event is non-problematic, such as an end-station which has moved from a first port within a certain VLAN to another port which is within the same VLAN, a suitable message is also preferably displayed.

Preferably, the system is operative to detect a mismatch between the network address of an end-station and a VLAN to which the port to which the end-station is connected belongs, to determine a new VLAN which matches the network addresses of all end-stations connected to the port, and to assign the new VLAN to the port.

Optionally, the system is operative to store a record of problematic and non-problematic events occurring at network elements. A record of a problematic event typically comprises, a description of a contradictory VLAN assignment associated with the problematic event and one of the following:

a. A recommendation describing how a human operator may resolve the contradictory VLAN assignment; and b. A description of a system action which resolves the contradictory VLAN assignment.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendix A is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. Apparatus for managing a switched routed network comprising:
    a network configuration learning unit learning a configuration of the switched routed network without forwarding traffic via the switched routed network, the network configuration learning unit comprising a poller polling at least one element of the switched routed network to obtain polling information regarding at least one division of the network into subnets of elements which communicate differently between themselves than with elements which do not belong to that subnet;
    a VLAN assignment unit generating a division of the network into virtual LANs (VLANs) based on the output of the poller wherein at least one results of the polling information is used to generate an initial division of the network and to set up the VLANs; and
    a network configuration change manager and modifier detecting a change in the configuration of the network and modifying the division of the network into VLANs.

2. Apparatus according to claim 1 wherein the configuration of the network includes physical configuration aspects and logical configuration aspects.

3. Apparatus according to claim 1 the network comprising:
    a switching skeleton including at least one switching hub interconnected by a switch backbone, each switching hub including at least one port; and
    a plurality of end-stations each having a unique physical address and each communicating with an individual one of the switching hubs via one of the switching hub's ports, thereby defining a plurality of end-station to port connections, the plurality of end-stations including at least one router,
    the network configuration learning unit comprising:
        an end-station to port connection learning unit learning polled associations between ports and physical addresses of the end-stations communicating therewith;
        a physical address-logical address association learning unit learning polled associations between logical addresses and physical addresses; and
        an end-station to logical address association learning unit deriving associations between ports and logical addresses from said polled associations between ports and physical addresses of the end stations and said polled associations between logical addresses and physical addresses.

4. Apparatus according to claim 3 wherein said physical address-logical address association learning unit comprises:
    a physical address scanner which scans physical addresses of at least some of said plurality of end stations; and
    an active logical address finder which actively finds an associated logical address upon encountering each physical address.

5. Apparatus according to claim 4 wherein each said logical address comprises an IP network layer address and wherein the network comprises an IP network which is partitioned into a multiplicity of IP subnets and wherein each IP network layer address belongs to an individual one of said multiplicity of subnets and wherein said apparatus for learning also comprises apparatus for determining all IP subnets into which the IP network is partitioned.

6. Apparatus according to claim 4 wherein each said logical address comprises an IPX protocol network layer address and wherein the network is partitioned into a multiplicity of IPX networks and wherein each IPX protocol network layer address belongs to an individual one of said multiplicity of IPX networks and wherein said apparatus for learning also comprises apparatus for determining all IPX networks into which the IPX network is partitioned.

7. Apparatus according to claim 5 wherein said physical address-logical address association learning unit sends a multiplicity of ICMP echo request packets to each of at least some of said plurality of end stations, each echo request packet including a physical destination address and an IP network layer destination address which includes an IP broadcast address of an individual one of said multiplicity of subnets;
    and wherein the echo request packet sent to an individual end station has a physical destination address which is the physical address of the individual end station.

8. Apparatus according to claim 7 wherein said physical address-logical address association learning unit comprises an ICMP echo reply packet analyzer deriving a physical address—IP address association from each arriving ICMP echo reply packet.

9. Apparatus according to claim 6 wherein said physical address-logical address association learning unit sends an IPX diagnostic packet to each of at least some of said plurality of end stations, an IPX diagnostic packet including a physical destination address and an IPX network layer destination address which includes an IPX broadcast address;
    and wherein the IPX diagnostic packet sent to an individual end station comprises an IPX diagnostic packet whose physical destination address is the physical address of the individual end station.

10. Apparatus according to claim 9 wherein said physical address-logical address association learning unit comprises an IPX diagnostic packet analyzer deriving a physical address—IPX address association from each arriving IPX diagnostic reply packet.

11. Apparatus according to claim 3 wherein said physical address-logical address association learning unit includes an IP network layer address identifier passively identifying, for each physical address, a logical address comprising an IP network layer address,
    and wherein said IP network layer address identifier listens for ARP packets and analyzes the ARP packets and derives therefrom IP network layer addresses.

12. Apparatus according to claim 3 wherein said network comprises an IPX network, and wherein said plurality of end-stations comprises at least one IPX file servers and at least one NetWare clients, and wherein each of the IPX clients is served by one of the at least one IPX file servers, and wherein said network configuration learning unit also comprises a server-client learner identifying servers and clients from among said plurality of end-stations and learning relationships between said servers and said clients.

13. Apparatus according to claim 1 the network comprising:

a switching skeleton including at least one switching hub interconnected by a switch backbone, each switching hub including at least one port; and a plurality of end-stations each having a unique physical address and each communicating with an individual one of the switching hubs via one of the switching hub's ports, thereby defining a plurality of end-station to port connections, the plurality of end-stations including at least one router, the VLAN assignment unit comprising:

an end-station grouper dividing the plurality of end-stations into sets, wherein each set comprises at least one end-station; and grouping together each first and second set from among said sets if at least one of the end-stations in the first set is associated with the same port as at least one of the end-stations in the second set, thereby to generate at least one disjoint groups; and a VLAN allocator allocating a VLAN to each of the at least one disjoint groups characterized in that packets sent by an individual end-station connected to a port belonging to an individual VLAN, including broadcasts packets, are transmitted only to end-stations connected to one of the ports within the same VLAN.

14. A method according to claim 13 wherein the network comprises an IP network which is partitioned into a multiplicity of IP subnets and said sets respectively correspond to said IP subnets.

15. A method according to claim 13 wherein the network is partitioned into a multiplicity of IPX networks and said sets respectively correspond to said IPX networks.

16. A method according to claim 13 wherein the network comprises an IPX network and wherein said plurality of end-stations comprises at least one IPX file servers and at least one IPX clients and wherein each of the IPX clients is served by one of the at least one IPX file servers, and wherein each of said sets comprises an individual IPX file server and the IPX clients served thereby.

17. A method according to claim 16 and wherein the VLANs are allocated so as to increase the number of clients which communicate directly with their servers rather than via a router.

18. A method according to claim 13 and also comprising the step of allocating global VLANs to at least one of the ports so as to reduce the number of end-station pairs which hear broadcast packets arriving to one another.

19. A method according to claim 18 and also comprising the step of allocating global VLANs to at least one of the ports so as to minimize the number of end-station pairs which hear broadcast packets arriving to one another.

20. Apparatus according to claim 1, the network including a plurality of network elements, the change manager comprising:

an event detector detecting at least one event at an individual network element including detecting the identity of the individual end-station, the event comprising at least one of the following: at least one logical change; at least one physical change; and at least one communication failure; and an event categorizer categorizing at least one event as a problematic event or a non-problematic event and, if the event is categorized as problematic, alleviating the failure situation, wherein said event detector also comprises:

a mismatch detector detecting a mismatch between the network address of an end-station and a VLAN to which the port to which the end-station is connected belongs; and a VLAN identifier determining a new VLAN which matches the network addresses of all end-stations connected to said port; and assigning the new VLAN to the port.

21. A method according to claim 20 wherein said at least one physical change comprises at least one of the following:

at least one new end-station added at at least one individual port within the network; and at least one end-station which has moved from a first port within the network to a second port within the network.

22. A method according to claim 20 wherein said at least one logical change comprises an IP address of at least one end-station which has changed.

23. A method according to claim 20 wherein said at least one communication failure comprises at least one of:

a failed attempt of an IPX client end-station to initially connect to a server end-station; and an IPX client end-station which has been disconnected from a server end-station.

24. A method according to claim 20 wherein said analyzing and alleviating step comprises:

detecting a mismatch between the network address of an end-station and a VLAN to which the port to which the end-station is connected belongs; and determining a new VLAN which matches the network addresses of all end-stations connected to said port; and assigning the new VLAN to the port.

25. A method according to claim 20 and also comprising storing a record of problematic and non-problematic events occurring at network elements.

26. A method according to claim 25 wherein said record of problematic events comprises, for each problematic event, a description of a contradictory VLAN assignment associated with the problematic event.

27. A method according to claim 26 wherein said record of problematic events comprises, for at least one problematic event, a recommendation describing how a human operator may resolve the contradictory VLAN assignment.

28. A method according to claim 26 wherein said record of problematic events comprises, for at least one problematic event, a description of a system action which resolves the contradictory VLAN assignment.

29. A method according to claim 20 wherein said step of alleviating comprises alerting a human operator that a problematic event has occurred.

30. A method according to claim 25 wherein said step of alleviating comprises alerting a human operator that a problematic event has occurred.

31. Apparatus according to claim 1 wherein each VLAN comprises a physical network allowing a particular mode of communication between only those network elements which belong to that VLAN.

32. Apparatus according to claim 1 wherein elements of each individual subnet communicate between themselves directly and communicate with elements which do not belong to said individual subnet only via a router.

33. Apparatus according to claim 2 wherein at least a portion of said switched routed network comprises an IP network and wherein said subnets of elements comprise IP subnets.

* * * * *